(12) United States Patent
Welsh

(10) Patent No.: US 7,529,716 B1
(45) Date of Patent: May 5, 2009

(54) MAIL ARBITRATOR

(76) Inventor: Thomas M. Welsh, 10720 Fournier Dr., Fairfax Station, VA (US) 22039

( * ) Notice: Subject to any disclaimer, the term of this patent is extended or adjusted under 35 U.S.C. 154(b) by 345 days.

(21) Appl. No.: 10/175,062

(22) Filed: Jun. 20, 2002

(51) Int. Cl.
G06K 9/00 (2006.01)
G06F 17/00 (2006.01)

(52) U.S. Cl. .................. 705/401; 382/101; 382/102

(58) Field of Classification Search ............... 400/414, 400/417; 705/7, 400–407; 382/101, 102; 209/584
See application file for complete search history.

(56) References Cited

U.S. PATENT DOCUMENTS

| | | | |
|---|---|---|---|
| 4,495,581 A * | 1/1985 | Piccione | 705/402 |
| 4,632,252 A | 12/1986 | Haruki et al. | |
| 5,059,127 A * | 10/1991 | Lewis et al. | 434/353 |
| 5,063,506 A * | 11/1991 | Brockwell et al. | 705/7 |
| 5,694,125 A | 12/1997 | Owsley et al. | |
| 5,719,921 A | 2/1998 | Vysotsky et al. | |
| 5,754,671 A | 5/1998 | Higgins et al. | |
| 5,805,710 A | 9/1998 | Higgins et al. | |
| 5,810,174 A | 9/1998 | Hamada et al. | |
| 5,832,063 A | 11/1998 | Vysotsky et al. | |
| 5,842,165 A | 11/1998 | Raman et al. | |
| 5,887,072 A * | 3/1999 | Bashomatsu et al. | 382/101 |
| 5,895,448 A | 4/1999 | Vysotsky et al. | |
| 6,075,873 A | 6/2000 | Kondou et al. | |
| 6,076,054 A | 6/2000 | Vysotsky et al. | |
| 6,246,925 B1 | 6/2001 | Robinson et al. | |
| 6,269,171 B1 * | 7/2001 | Gozzo et al. | 382/101 |
| 6,373,012 B1 | 4/2002 | Crutchfield et al. | |

(Continued)

FOREIGN PATENT DOCUMENTS

EP 0965928 A2 * 10/1999

OTHER PUBLICATIONS

Donald P. D'Amato, et al., Results From a Performance Evaluation of Handwritten Address Recognition Systems for the United States Postal Service, In L.R.B. Schomaker and L.G. Vuurpijl; (Eds.) Proceedings of the Seventh International Workshop on Frontiers in Handwriting Recognition, Sep. 11-13, 2000, Amsterdam, ISBN 90-76942-01-3, Nijmegen: International Unipen Foundation, pp. 189-198.

*Primary Examiner*—Hani Kazimi
*Assistant Examiner*—Olabode Akintola
(74) *Attorney, Agent, or Firm*—Blank Rome LLP

(57) ABSTRACT

A universal cost minimizing mail arbitrator (UCMA) selects an optimum zip code result from a plurality of zip code results received from a plurality of mail processing directory match modules (DMM). The UCMA primarily has a cost tuner and an arbitration controller. The cost tuner receives truthed input for truthed mail, and user-defined cost profile parameters. The cost tuner determines an average weighted cost (AWC) for each DMM based upon the truthed input, to form a cost profile. The AWC is sorted in the cost profile based upon the Level of Sort (LOS) for the zip code result. The cost tuner gathers the cost profiles for each DMM together to form a cost profile array for all the DMMs. The arbitration controller receives the zip code results from the DMMs for each LOS code, and determines the lowest cost zip code result from amongst the various LOS codes based upon the AWC in the cost profile array. The arbitration controller selects the optimum zip code result based upon the lowest cost zip code result.

36 Claims, 10 Drawing Sheets

U.S. PATENT DOCUMENTS

| | | |
|---|---|---|
| 6,816,602 B2 | 11/2004 | Coffelt et al. |
| 7,095,875 B2 | 8/2006 | Rundle et al. |
| 2003/0200113 A1* | 10/2003 | Latta .............................. 705/1 |
| 2004/0266442 A1* | 12/2004 | Flanagan et al. ............ 455/445 |

* cited by examiner

Figure 1 – Prior Art

Figure 2 - Universal Cost Minimizing Arbitrator

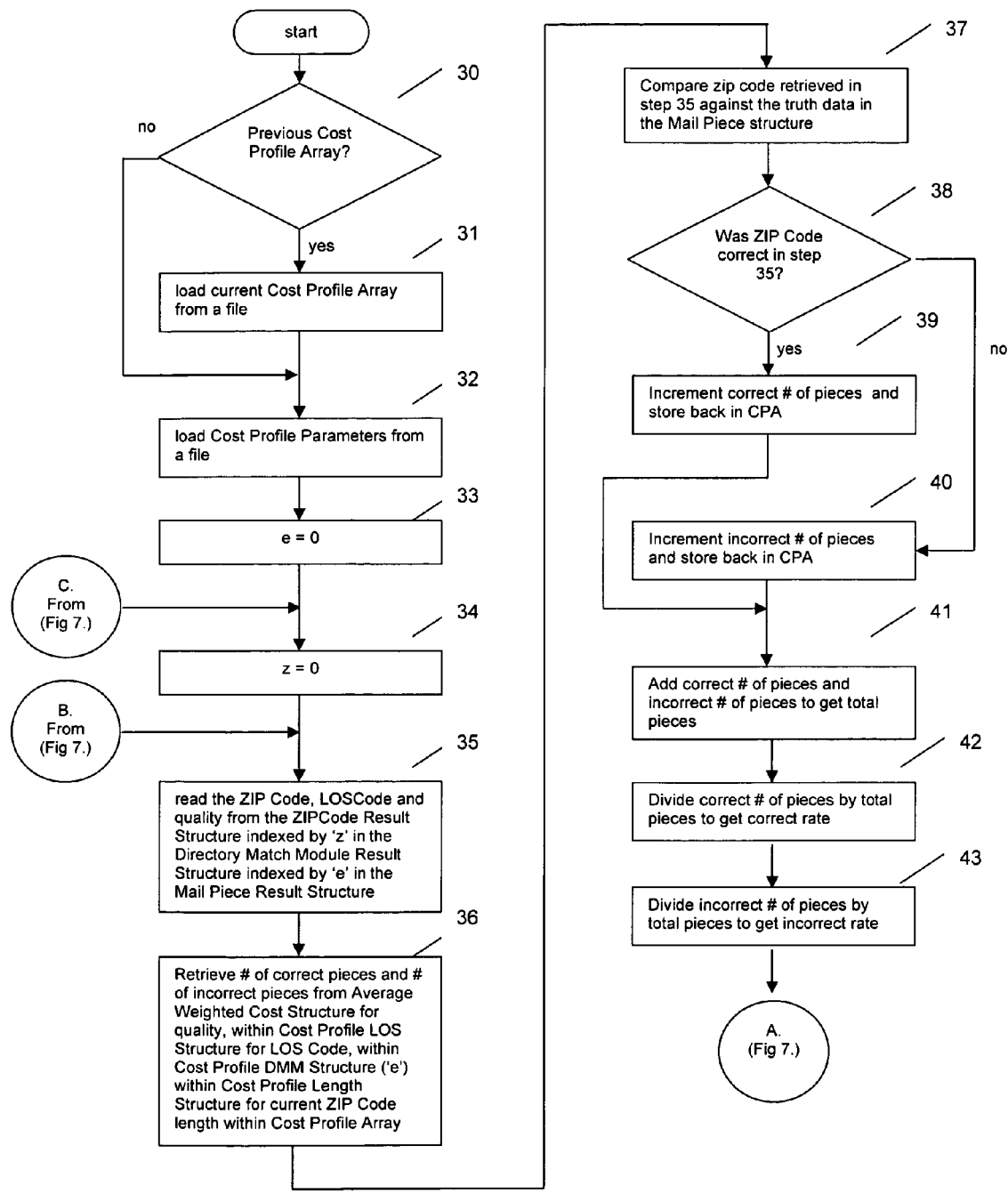
Figure 6 - UCMA Cost Tuner Formula (part 1)

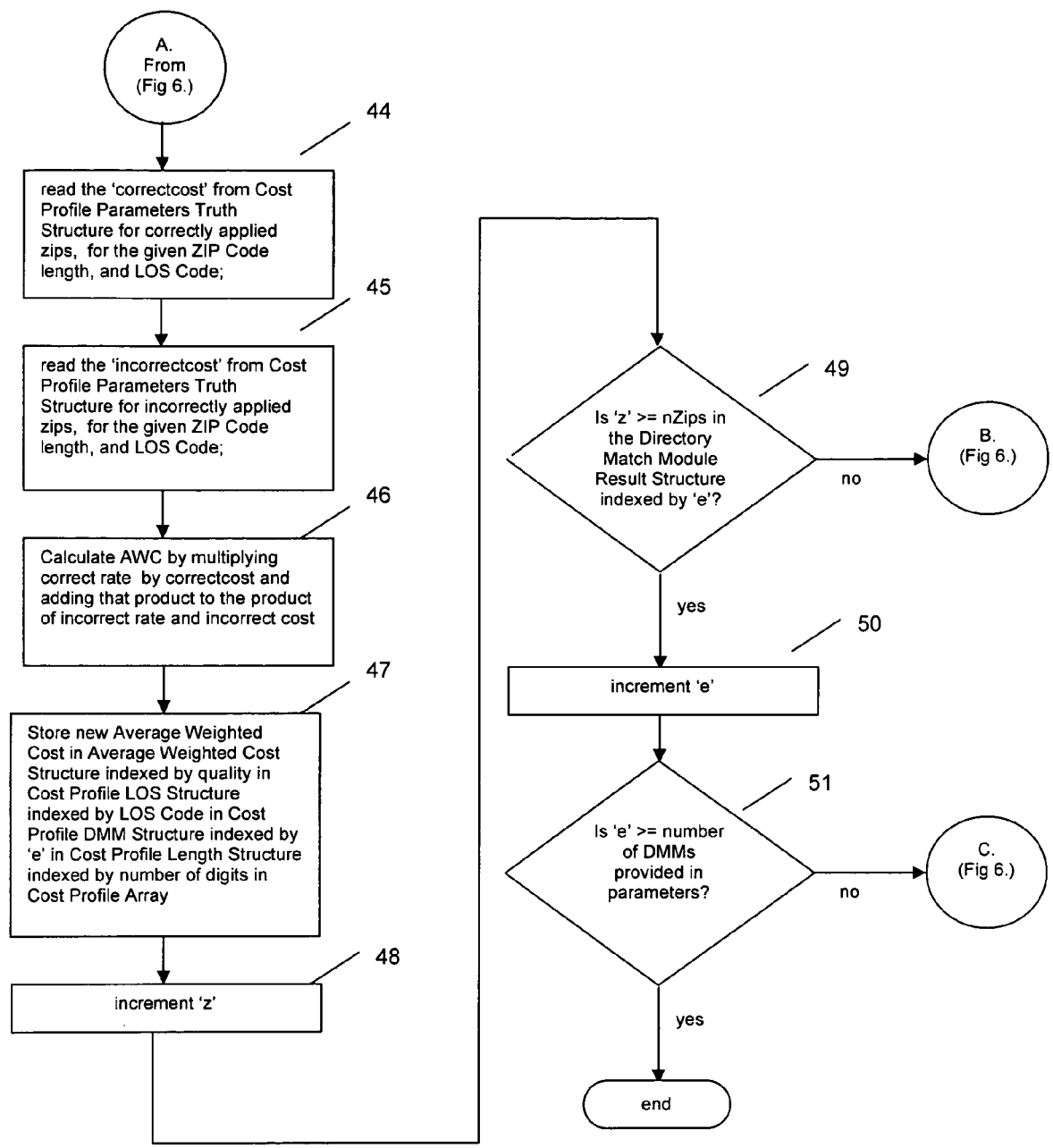
Figure 7 - UCMA Cost Tuner Formula (part 2)

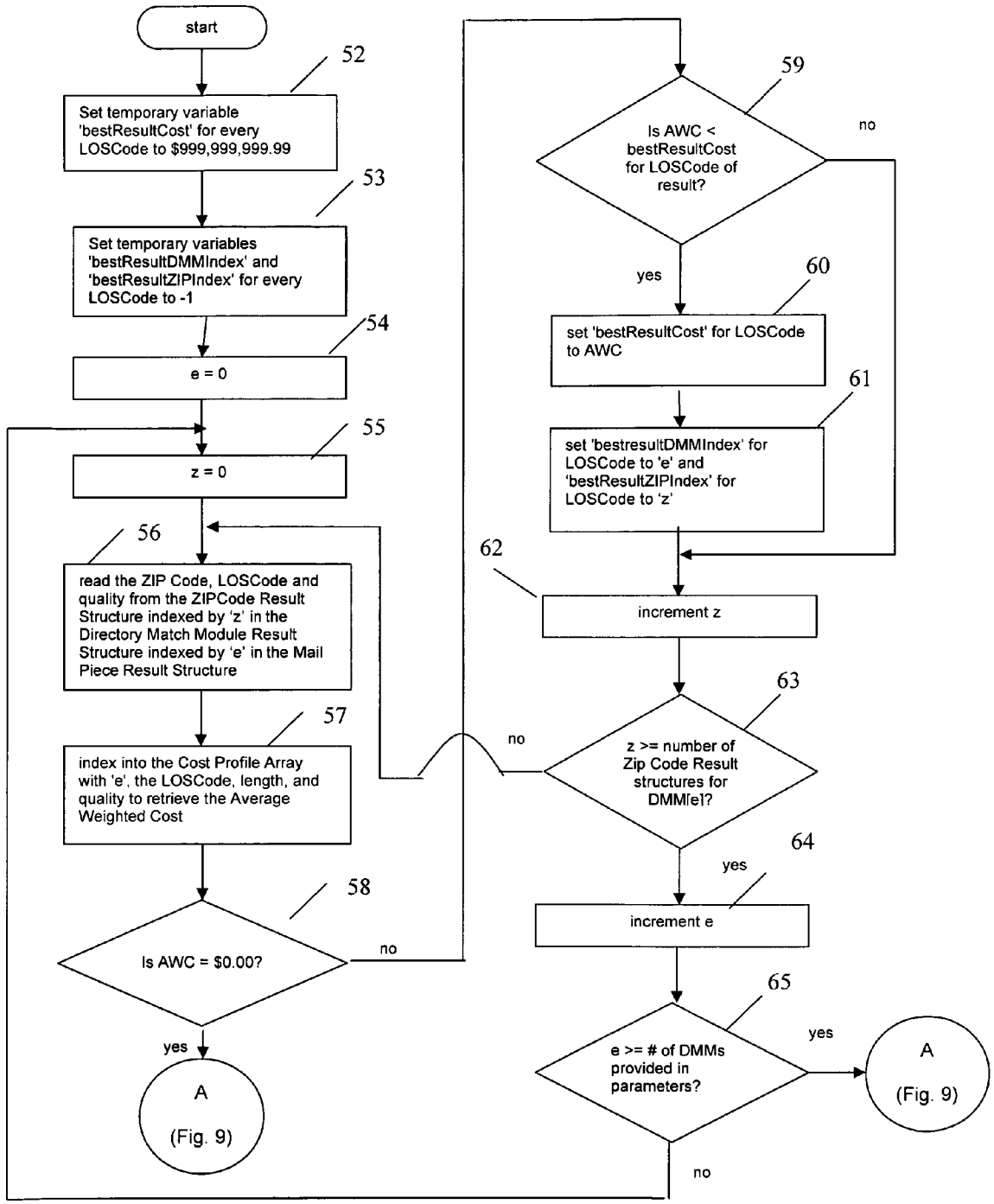
Figure 8 - UCMA Arbitration Formula (part 1)

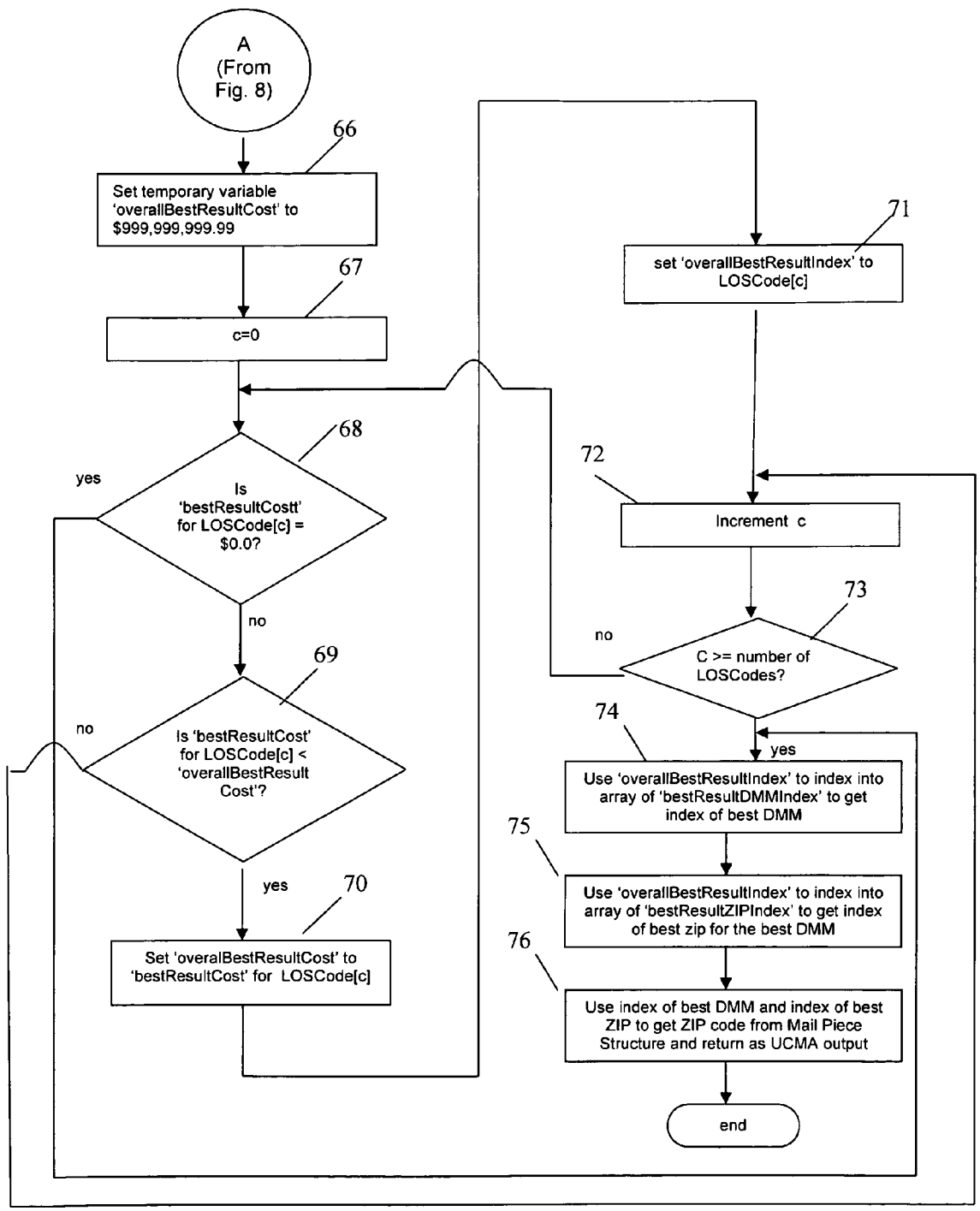
Figure 9 - UCMA Arbitration Formula (part 2)

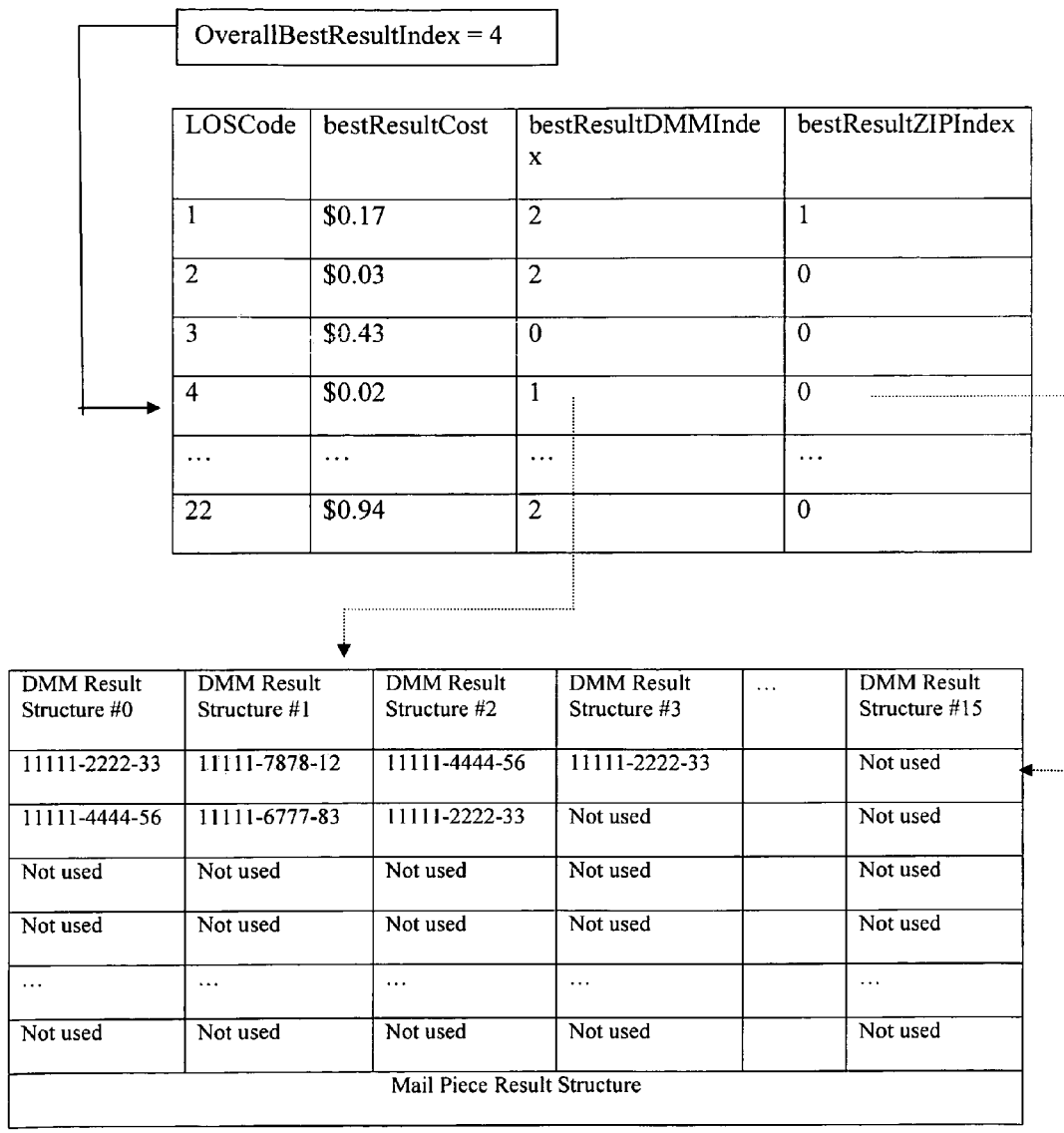
Figure 10 - Indexing To Final Result

MAIL ARBITRATOR

BACKGROUND OF THE INVENTION

1. Field of the Invention

The present invention relates to an arbitration device to arbitrate mail processing results from mail processing equipment and to select a best zip code for a given mail piece. More particularly, the invention relates to an arbitration device which selects a particular arbitrated result that minimizes the cost of correctly delivering the mail piece and is automatically tuned by the end user.

2. Background of the Related Art

The United States Postal Service (USPS) employs a large number and variety of automated mail processing equipment to handle parcels, magazines, and letters. A typical piece of mail processing equipment consists of a feeder to feed the mail past a camera, a camera to scan the image, a main computer to transmit the image to some number of recognition modules and directory match modules, where the same computer receives the final zip code result, a printer to spray a bar code, and a sorter to separate the mail into stackers. The equipment is assisted by a variety of recognition modules ("RM") and directory match modules ("DMM").

The main computer sends the scanned image of the front of a mail piece to the recognition module. This image is a pattern of pixels, either binary or gray-scale. The recognition module analyzes the image and generates a set of characters that represent its best attempt at identifying the location of the address on the mail piece and converting the pixels at that location to ASCII characters. In this way, the recognition unit is similar to Optical Character Recognition (OCR) devices used with desktop scanners to convert scanned documents into ASCII or Word files.

The directory match module receives the set of ASCII characters ("character data") from the recognition module and attempts to find a match for the character set in a database of addresses maintained by the USPS. If the directory match module is successful in this matching attempt, it will return a valid 5, 9, or 11-digit zip code to the main computer to be sprayed on the mail piece. It may also return a 0-digit zip code, which indicates that the DMM has rejected the mail piece because it cannot match the character data to the USPS data base. DMMs also have inherent error rates; they match information from the envelope to the wrong information in the USPS data base, due to poor OCR or bad information on the envelope.

As shown in FIG. 1, the USPS employs an arbitration technique to increase the amount of mail that can be successfully processed by the mail processing equipment. In general, arbitration works by sending the same image and/or set of recognized characters to multiple, parallel recognition modules and directory match modules. Each recognition module and directory match module combination conducts an independent analysis of the mail piece and provides a zip code result. Due to the different algorithms used by the different recognition and lookup units, the results may be conflicting. Thus, there may be two or more different zip code results for the same mail piece. One, or more, or all of these zip codes may be in error.

The goal of arbitration is to select the best results from the results offered by various recognition and directory match modules, such that the overall encode rate and error rate for mail, on average, is better than if using only the results from one DMM. In turn, a higher encode rate, and lower error rate, mean lower cost of delivery. For example, assume vendor A offers a recognition and lookup system that codes 50% of the mail with a 4% error rate, and is unable to code the other 50%. Assume vendor B offers a recognition and lookup system that codes the other 50% with a 2% error rate, but not the 50% coded by vendor A. If an arbitrator selects all available answers from vendor A, and all available answers from vendor B, then the overall encode rate is 100% with a 3% error rate. Thus, the error rate of a particular DMM directly affects the cost of delivery.

An arbitrator program is invoked to select the best result or to reject the mail piece. In the embodiment of FIG. 1, the arbitrator selects a zipcode result from amongst the various zip code results, zipcode result #1 through zipcode result #n.

Current arbitration techniques have certain limitations. The automation equipment is typically manufactured by different contractors, and information about the automation equipment and its output (such as its error rate) is not readily shared between the contractors. Accordingly, one limitation of current arbitrators is that the manufacturer of the arbitrators do not have access to all information related to the automation equipment that would assist the arbitrator in making its determination. And, though the end-user of the arbitrator (i.e., the USPS), is a "trusted user", meaning they have access to all of the proprietary error rate information, they are not well suited for incorporating that information into the arbitrator, due to lack of specific technical knowledge of the arbitrator, or data rights restriction placed on the arbitrator by the arbitrator manufacturer (typically a commercial firm). Consequently, the arbitrator may be incompatible with, or not properly interpret information from, the DMMs.

The manufacturer of the arbitrator, if a commercial firm, is limited in its ability to maximize the efficiency of the arbitrator. The cost-of-delivery information about existing directory match modules may be proprietary. Thus, existing arbitrators can not make use of cost information about existing directory match modules. For example, if a vendor A has a 10% error rate in its directory match module, vendor A ordinarily will not reveal that information to the vendor that manufactures the arbitrator, because the arbitrator vendor is often a direct commercial competitor of vendor A. However, the arbitrator vendor would need that information to tune its own arbitrator. This inability to share error rate information is a shortcoming of the existing arbitrator approaches, and the specific problem that current invention is design to correct.

SUMMARY OF THE INVENTION

Accordingly, it is an object of the invention to provide an arbitrator which does not require the owner of the DMM to reveal proprietary information about the DMM. It is a further object of the invention to provide an arbitrator which selects a zip code result based upon a cost of delivering a mail piece. It is yet another object of the invention to provide an arbitrator which selects a zip code result based upon a cost of delivering a mail piece that is weighted according to the quality of the zip code result. It is still a further object of the invention to provide an arbitrator which selects a zip code result based on a weighted cost of delivering a mail piece determined by the level of sort for the zip code. It is another object of the invention to provide an arbitrator that can automatically adjust its processing based on truthed input that is provided by the trusted user (e.g. USPS).

In accordance with these and other objects of the invention, a universal cost minimizing mail arbitrator (UCMA) is provided which selects an optimum zip code result from a plurality of zip code results received from a plurality of mail processing directory match modules. The UCMA primarily has a cost tuner and an arbitration controller. The cost tuner receives truthed input for truthed mail, and user-defined cost profile parameters. The cost tuner determines an average weighted cost for each DMM based upon the truthed input and cost profile parameters, to form a cost profile.

The AWC is sorted in the cost profile based upon the Level of Sort (LOS) for the zip code result. The cost tuner gathers the cost profiles for each DMM together to form a cost profile array for all the DMMs. The arbitration controller receives the zip code results from the DMMs for each available LOS code, and determines the lowest cost zip code result from amongst the various LOS codes based upon the AWC in the cost profile array. The arbitration controller then selects the optimum zip code result based upon the lowest cost zip code result.

BRIEF DESCRIPTION OF THE FIGURES

FIGS. 6 and 7 are flow charts depicting operation of the tuning algorithm for the cost tuner of the arbitrator.

FIGS. 8 and 9 are flow charts of the arbitration formula for the arbitration controller of the arbitrator.

FIG. 10 shows an example of indexing to obtain the final arbitration output result.

DETAILED DESCRIPTION OF THE PREFERRED EMBODIMENTS

Figure 1:
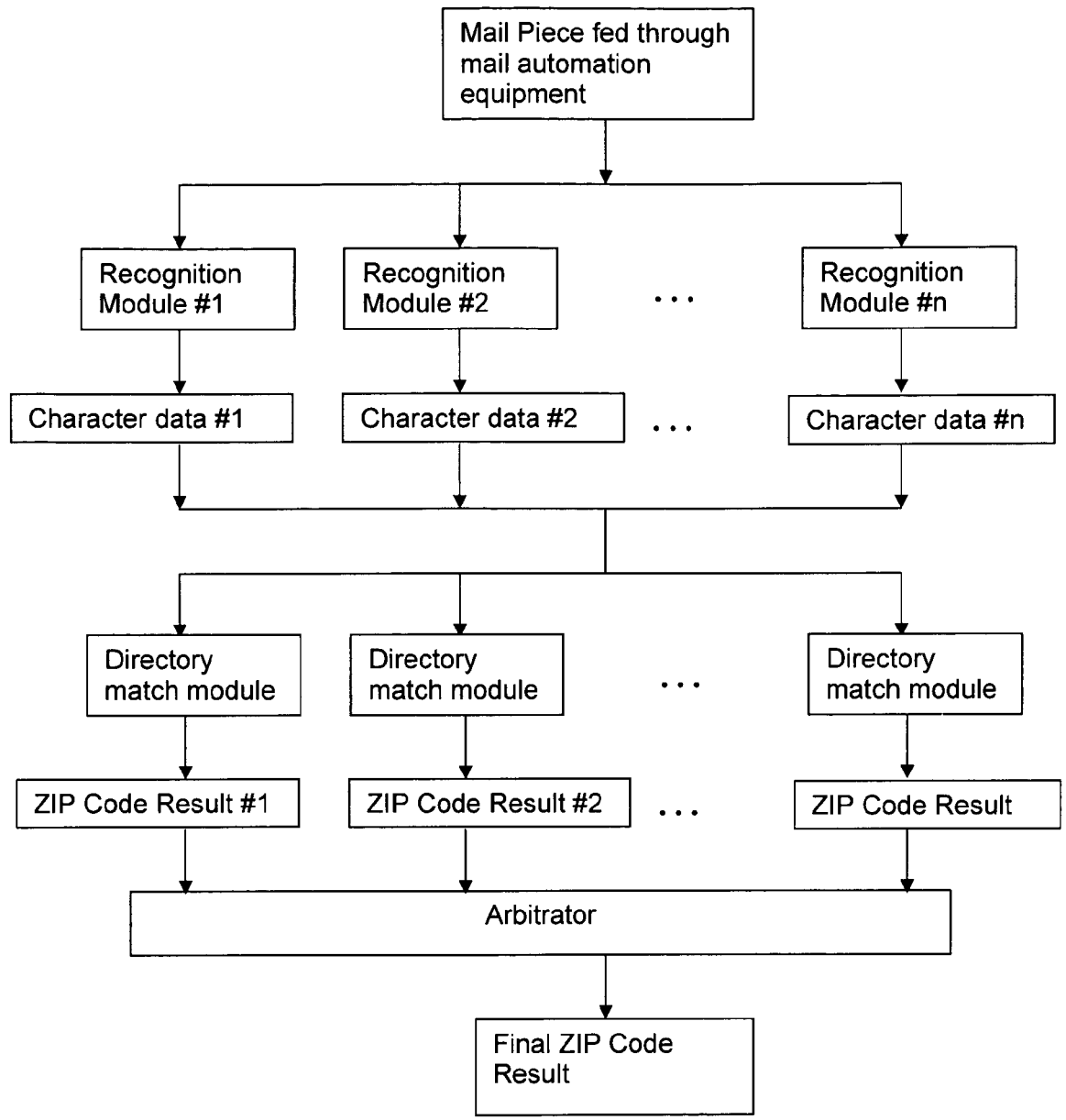
FIG. 1 is a block diagram of a system used to arbitrate mail in accordance with the prior art.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Figure 2:
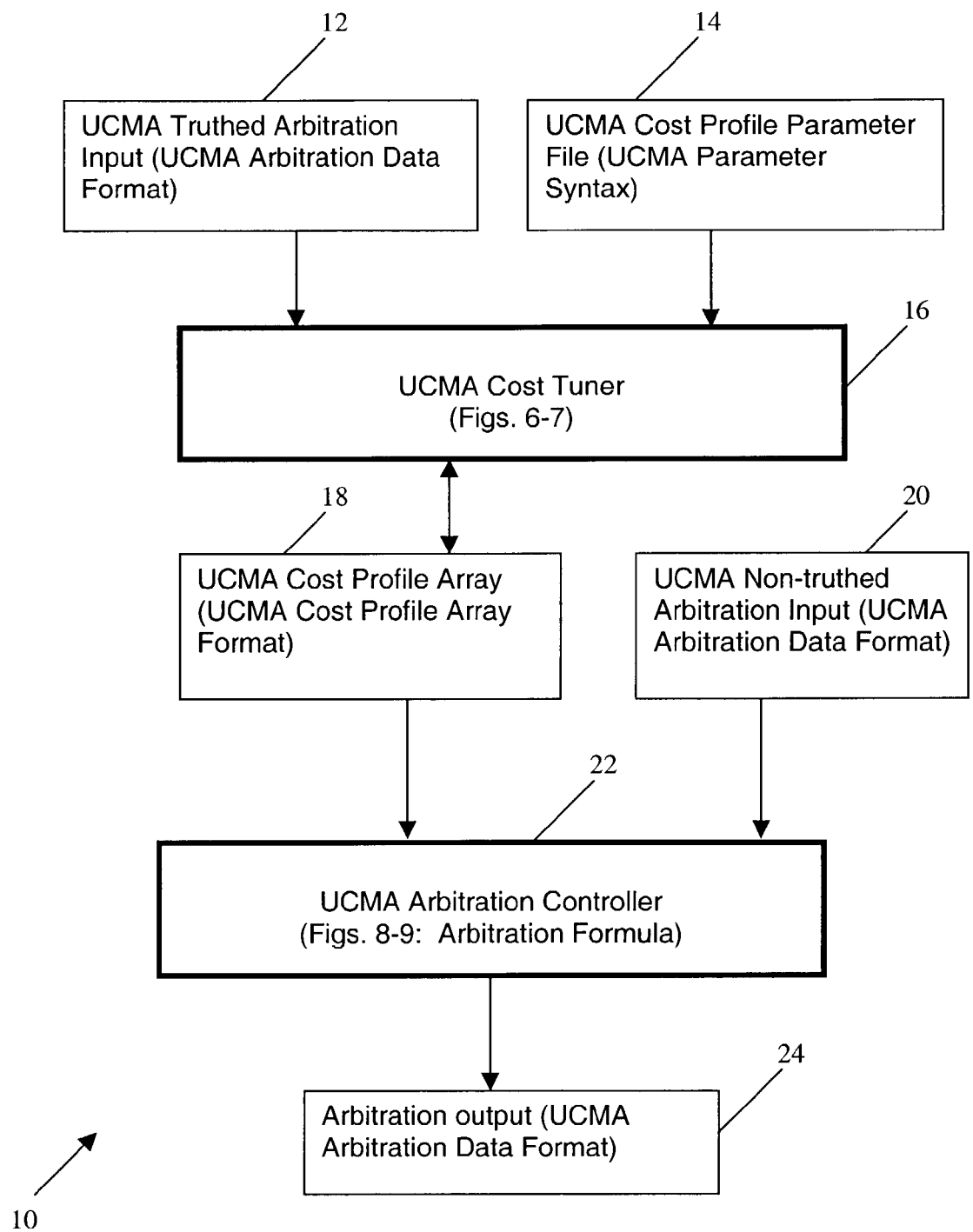
FIG. 2 is a block diagram of a universal cost minimizing arbitrator in accordance with the preferred embodiment of the invention.

Turning to the drawings, FIG. 2 illustrates a universal cost minimizing arbitrator (UCMA) 10 in accordance with the preferred embodiment of the invention. The arbitrator generally has a truthed input 12, cost profile parameter file 14, a cost tuner 16, a cost profile array 18, a non-truthed input 20, an arbitration controller 22 and an output 24. The arbitrator 10 is "universal" in that it can be used with any mail processing equipment, including directory match modules having different output formats.

Preferably, however, the format of data input to the arbitrator 10 is in a standardized format. Thus, the truthed arbitration input 12, the non-truthed arbitration input 20, and the arbitration output 24 are in a unique arbitration data format (FIG. 3), the data from the cost profile parameter file 14 is in a unique parameter syntax (FIG. 4), and the cost profile array 18 is in a unique cost profile array format (FIG. 5). It may therefore be necessary to convert data from a mail processing equipment to the UCMA arbitration data format to be input as non-truthed data 20 to the arbitration controller 22.

The cost tuner 16 receives the truthed arbitration input 12 and cost profile parameters from the cost file 14. Truthed mail refers to mail pieces for which the truth, or correct zip code result, is known. The cost tuner 16 generates a cost profile for each mail processing equipment (i.e., directory match module), and combines the profiles into a cost profile array 18.

The cost profile includes an average weighted cost (AWC) for a range of DMM qualities of 0-100 for each Level-of-Sort (LOS). The AWC is determined from the costs to correctly and incorrectly deliver a mail piece, which is then associated with the quality and LOS for a truthed mail piece. The cost tuner 16 or the controller 22 can interpolate for values of quality and LOS that are not represented by truthed mail pieces, based upon the data points for the truthed mail pieces. As new truthed mail pieces arrive, the cost tuner 16 updates the data stored in the cost profile array 18.

The arbitration controller 22 receives the cost profile array 18 and the non-truthed arbitration input 20 and generates an arbitration output 24. The input 20 has a quality and LOS associated with the zip code result. The arbitration controller 22 finds the AWC for the quality and LOS in the cost profile array 18, and bases the output 24 upon the lowest AWC for that mail piece, after examining the AWC for all zip code results received from all directory match modules.

Thus, the cost tuner 16, truthed arbitration input 12 and cost profile parameters 14 are only used to generate and update the cost profile array 18. The arbitration controller 22 receives the actual input from the DMMs as non-truthed input 20, and refers to the cost profile array 18 to generate the arbitration output 24. Hence, once the cost tuner 16 creates the cost profile array 18, the cost tuner 16 remains inactive and is only again used to update the cost profile array 18 if new truthed mail piece data 12 is received.

Cost Tuner 16

Figure 3:
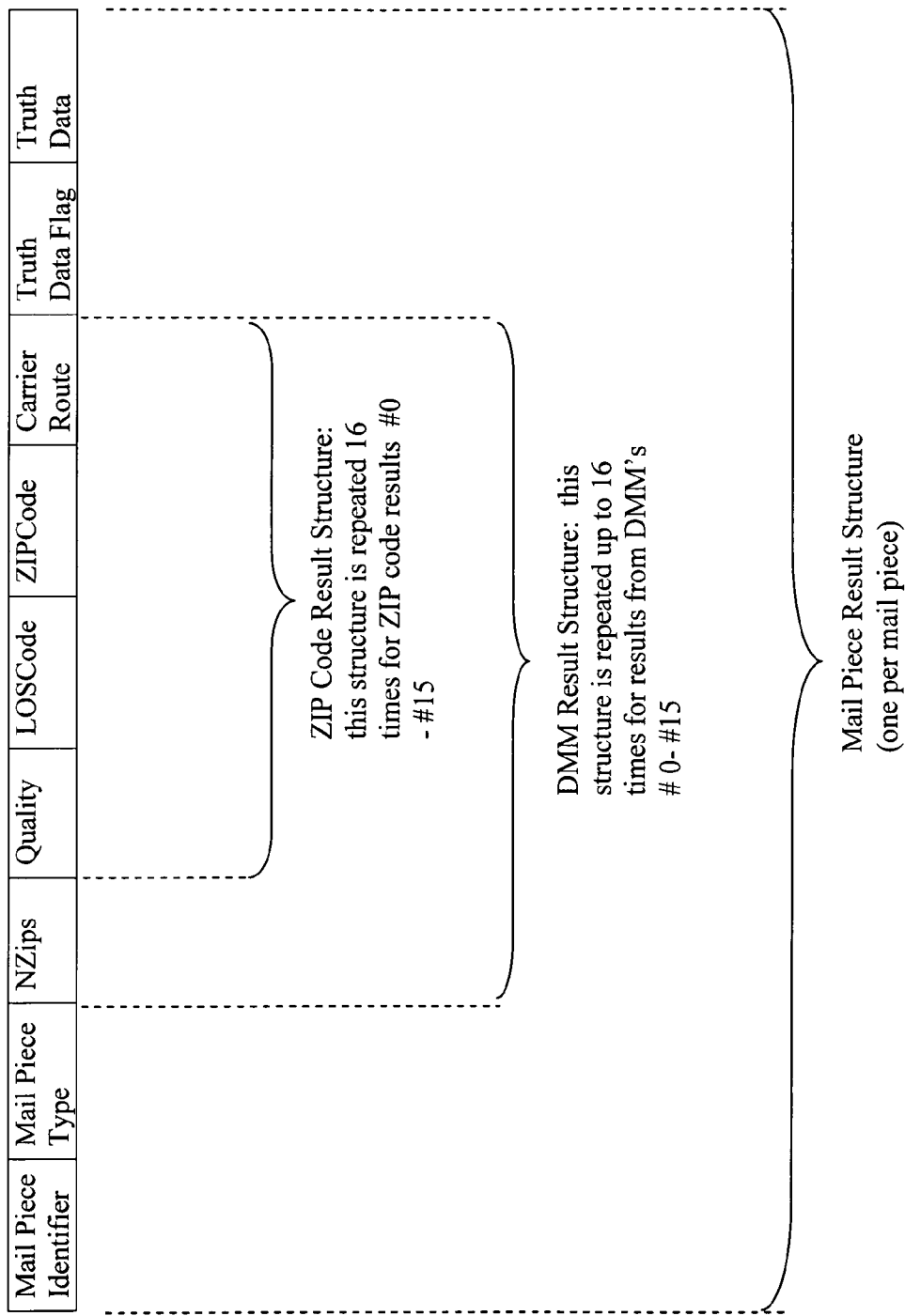
FIG. 3 shows the arbitration data format for the truthed and non-truthed arbitration input, as well as the arbitration output, of the arbitrator.

As shown in FIG. 2, the cost tuner 16 receives truthed arbitration input from the truthed arbitration input 12 and cost profile parameters from the cost file 14. The truthed arbitration input 12 inputs truthed mail piece result data into the arbitrator 10. The truthed data is used to automatically tune the arbitrator 10 by defining the cost profile array 18. The truthed input data is provided in a unique UCMA data representation format (FIG. 3). The actual contents of the truthed input 12 is determined at run-time. Typically, from 100,000 to 1,000,000 truthed mail pieces may initially used to tune the arbitrator 10. As truthed mail pieces are continually received, the cost tuner 16 updates the cost profile array 18, which in turn tunes the arbitration controller 22 to provide a more tuned output 24.

The cost profile parameters stored in the cost parameter file 14 are the actual values provided as data contents at run-time, as opposed to the syntax of the parameters, which is specified in a unique UCMA parameter syntax. The actual values of the parameters are determined at run-time. The cost tuner 16 uses truthed data from the truthed arbitration input 12, the cost profile parameters from the cost parameter file 14 and the cost profile array 18, to tune and output a new cost profile array 18. When the arbitrator starts up, the previous CPA 18 is read from a file and stored in memory. It is read from, and written to in memory as it is used and tuned. When the arbitrator is shutdown, the CPA 18 is written to disk. Tuning automatically occurs whenever the arbitrator 10 receives tuning data from the truthed arbitration input 12.

Arbitration Data Format

As shown in FIG. 3, the arbitrator 10 has a unique data representation format for representing arbitration mail piece data input and output. The data representation format is a data structure which is used to represent the truthed and non-truthed arbitration input data 12, 20, respectively, as well as the output data 24.

The arbitration input data 12, 20 includes a zip code result, a directory match module result, and a mail piece result, which in turn have a ZIP Code Result Structure, DMM Result Structure and Mail Piece Result Structure, respectively. The ZIP Code Result structure represents one zip code result from one DMM for a particular mail piece. The DMM Result Structure represents all of the zip code results from one DMM, and preferably has up to 16 zip codes, each presented in the format of ZIP Code Result Structure. The Mail Piece Result Structure represents all of the DMM results for a particular mail piece, and therefore incorporates up to 16 DMM Result Structures. In the embodiment of FIG. 3, however, only a single ZIP Code Result and DMM Result is shown for the Mail Piece Structure.

Each zip code result is associated with a carrier route, quality value and an LOS code, and therefore the ZIP Code Result Structure has a "quadruple" structure consisting of "quality, LOSCode, ZIPCode, CarrierRoute". This ZIP Code Result Structure represents one zip code result from one DMM for a particular mail piece. There can be up to 16 zip codes from any DMM, though more or fewer zip codes can be accommodated. Thus, there will be up to 16 quadruples from each DMM such that, for example, if there are three DMMs that are generating results, there may be up to forty-eight quadruples for a single mail piece.

The term "quality" in the ZIP Code Result Structure is a value that expresses the particular DMM's quality for the result, as determined independently by the DMM's own proprietary logic. The quality value is expressed as a binary integer in the range of 0-100. The "quality" is a value that the DMM provides to indicate how confident the DMM is in that result. The term "ZIPCode" is the zip code result from the DMM, and is expressed as a null-terminated 12-character ASCII string. The term "CarrierRoute" indicates which carrier will take the mail out of the station for delivery. Carrier routes might includes parts of several zip codes. The CarrierRoute is expressed as a 5-character null-terminated ASCII string.

The term "LOSCode" indicates the type of location the mail piece is to be delivered to, such as a street, PO box, firm, etc. The LOS code is expressed as a 3-character null-terminated ASCII string. The values used to represent LOSCode in the UCMA 10 are set forth in Table 1. The term "firm" refers to the delivery of a mail piece to a business that has its own 9-digit code, unique for that business. In those instances where the zip code can be either a 9- or 11-digit zip code (as shown with an asterisk in Table 1), and a 9-digit zip code is returned by a directory match module, the 11-digit zip code is presumed to be the 9-digit zip code with "99" appended thereto.

TABLE 1

Level-of-Sort Values

| Index in cost profile array | Description | String code | Zip code lengths |
|---|---|---|---|
| 1 | Firm | "FF" | 9 or 11* |
| 2 | Secondary Firm | "FS" | 9 or 11* |
| 3 | Primary Firm | "FP" | 9 or 11* |
| 4 | PO Box | "PO" | 11 |
| 5 | Apartment or suite | "AP" | 11 |
| 6 | Building | "BD" | 9 or 11* |
| 7 | Street | "ST" | 11 |
| 8 | Rural Route | "RR" | 11 |
| 9 | Rural Route Default | "RD" | 9 or 11* |
| 10 | Zone | "Z5" | 5 |
| 11 | Default Zone | "ZD" | 5 |
| 12 | Reject | "RJ" | 0 |
| 13 | 5-digit unique | "ZU" | 5 |
| 14 | Read zip from mailpiece - 5digit | "MA" | 5 |
| 15 | Read zip from mailpiece - 9digit | "MB" | 9 |
| 16 | Read zip from mailpiece - 11digit | "MD" | 11 |
| 17 | Multiple equivalent answers | "NU" | 5, 9, or 11 |
| 18 | Postmaster | "PM" | 9 or 11* |
| 19 | General delivery | "GD" | 9 or 11* |
| 20 | Foreign country | "ON" | 5 |
| 21 | Foreign city | "OC" | 5 or 9 |
| 22 | Unknown | "??" | 5, 9, or 11 |
| 23 | All | "**" | 5, 9, or 11 |

The cost to deliver a mail piece to an address depends upon the LOS of the zip code placed on the mail piece. For example, consider the hierarchy for the law firm Blank Rome Comisky & McCauley, which has an address of 900 $17^{th}$ Street NW, Suite 1000, Washington D.C. The zip code 20000 is the default zone for Washington D.C., with a LOS Code of "ZD". Next in the hierarchy is 20006 which means the part of Washington where the address is located, and an LOS Code of "Z5". The zip code 20006-2500 represents the even side of $17^{th}$ street from 900-908. The LOS code would be "ST".

Deeper into the hierarchy, is the zip code 20006-2501, which means the building at 900 $17^{th}$ St., LOS Code is "BD". Next comes the zip code 20006-2513, which means suite 1000, with an LOS Code of "AP". The final item in the hierarchy is Blank Rome Comisky & McCauley with a unique 9-digit zip code of 20006-2595. The $10^{th}$ and $11^{th}$ digits depend on the LOS Code. Firms and buildings all have a $10^{th}$ and $11^{th}$ code of 99, which may be "hidden" such that the 11-digit zip code is actually 20006-259599. Mailers are encouraged to put all 11 digits on mail, but if they only put 9 digits, and it's for a building or firm, the $10^{th}$ and $11^{th}$ digits are always understood to be 99, so in practice it is irrelevant whether the mailer uses a 9 digit or 11 digit zip code. Street addresses are based on the last 2 digits of the house number.

The DMM Result Structure represents all of the zip code results from one DMM for a particular mail piece. The DMM Result Structure is expressed as "nZips, ZIP Code Result Structure #0 . . . # 15". The nZips term represents the number of ZIP Code Result Structures which are present for the DMM, and is expressed as a binary integer in the range of 0-15 (though the system can accommodate more or fewer results). Thus, the nZips term indicates the number of times the ZIP Code Result Structure is repeated within the DMM Result Structure. The ZIP Code Result Structure is the structure defined above.

The Mail Piece Result Structure represents all of the DMM results for a particular mail piece. The Mail Piece Result Structure is expressed as "Mail Piece Identifier, Mail Piece Type, DMM Result Structure #0 . . . #15, Truth Data Present Flag, Truth Data, Carrier Route". The Mail Piece Identifier is a 32-bit unsigned integer which uniquely identifies a mailpiece within a stream of several mail pieces. The Mail Piece Identifier is expressed as a binary integer in the range of $0\text{-}(2^{32}-1)$, though any upper limit can be provided. The Mail Piece Type is either an 'H' for handwritten or 'M' for machine print, followed by a null terminator. The DMM Result Structure is the structure defined above. There are preferably up to about 16 DMM Result Structures, though more or fewer can be allowed.

The Truth Data Present Flag is either a 'Y' to indicate that truth data is present, or an 'N' to indicate that truth data is not present and that the Truth Data field should be skipped. The Truth Data Present Flag is a single character followed by a null terminator. The Truth Data represents the correct result for this mail piece, and is expressed as a DMM result in accordance with the DMM Result Structure above. The Truth Data Present Flag is set to 'Y', and Truth Data is included, for the Truthed Arbitration Input 12. For the Non-truthed Arbitration Input 20, the Truth Data Present Flag is set to 'N', and no Truth Data is included.

As applied to the arbitration output 24, the Mail Piece Result Structure would only have a single ZIP Code Result Structure and a single DMM Result Structure. Accordingly, the nZips would be set to 1, and the Truth Data Flag would be 'N'.

Cost Profile Parameters

Figure 4:
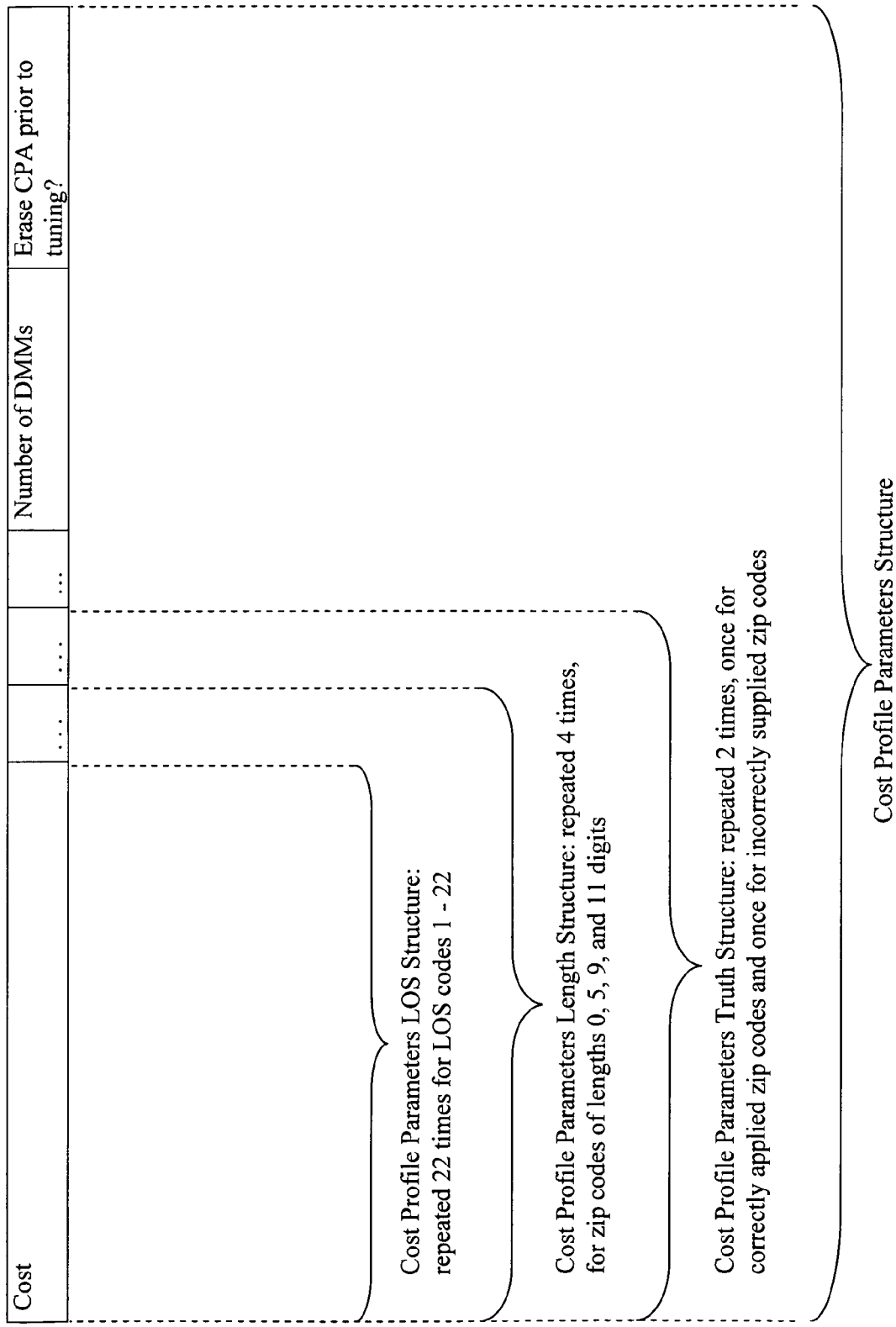
FIG. 4 shows the cost profile parameter format for use with the arbitrator.
Figure 5:
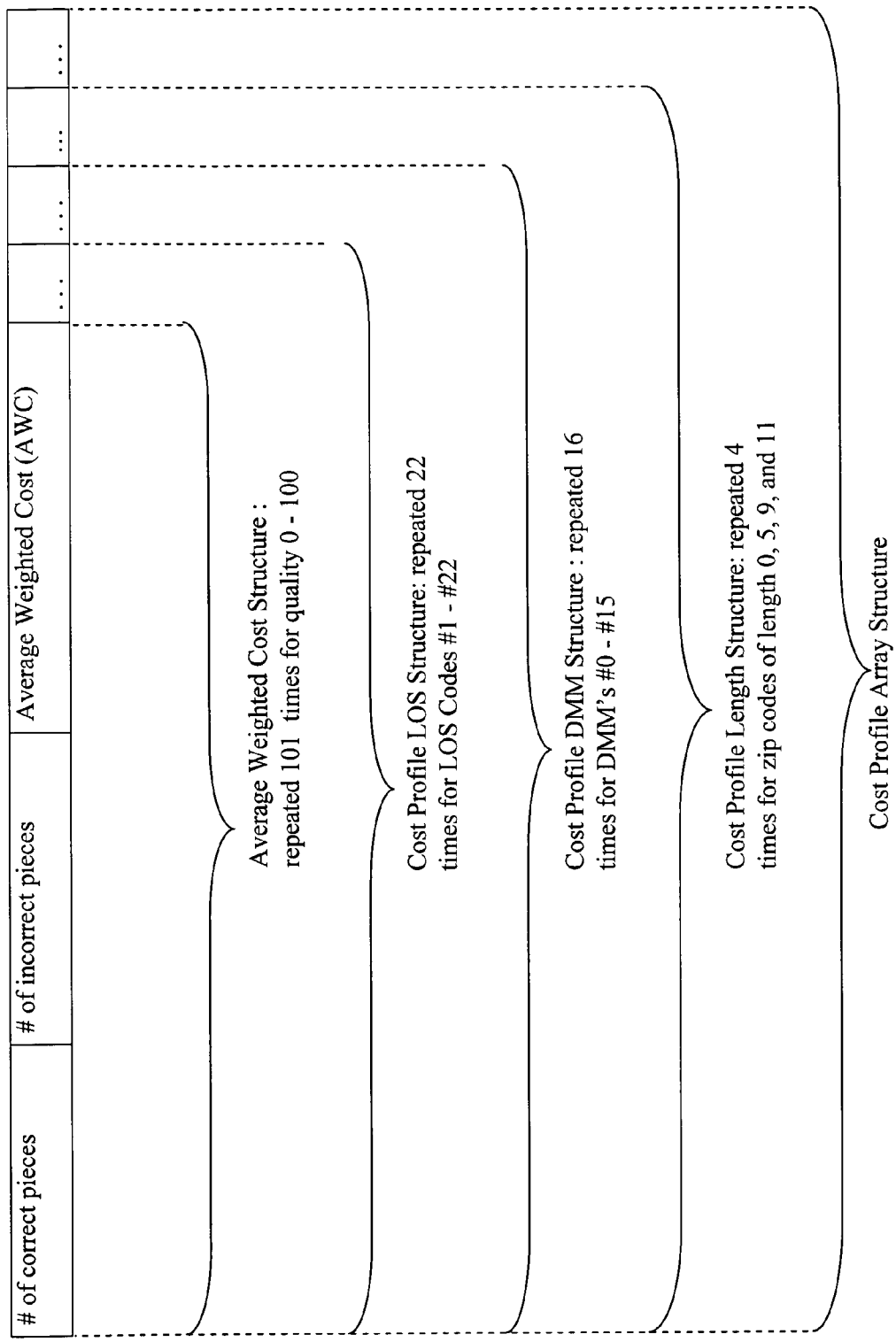
FIG. 5 shows the cost profile array format for the cost profile array of the arbitrator.

FIG. 4 shows the structure for the cost profile parameters. The cost profile parameters are used to define cost, and are used by the cost tuner 16 to calculate a cost profile for a directory match module. The cost profile parameters are provided by the end user, i.e., the USPS, so that the owner/operator of the arbitrator 10 need not obtain any information from the owner/operators of the various mail processing equipment.

The Cost Profile Parameters Structure is used to store all of the UCMA parameters. The Cost Profile Parameters Truth Structure is used twice, once to store parameters for correctly applied zip codes, and once to store parameters for incorrectly applied zip codes. Within the Cost Profile Parameters Truth Structure, there exists the Cost Profile Parameters Length Structures. There are four of these Cost Profile Parameters Length Structures, one each for parameters for zip codes of length 0-digits, 5-digits, 9-digits, and 11-digits.

Within the Cost Profile Parameters Length Structure are the Cost Profile Parameters LOS Structures. There are 22 of these Cost Profile Parameters LOS Structures, one each for the zip codes for LOS Codes from 1-22. The Cost field indicates the cost of the parameter.

The Cost Profile Parameter Structure also includes a field for the Number of DMMs, and an indication of whether or not the previously existing cost profile array 18 is to be erased prior to further tuning, or is to be used as a basis for further tuning. This indication is either a "Y" to erase the prior CPA, or an "N" to not erase the prior CPA.

Accordingly, the Cost Profile Parameters Structure includes 22 Cost Profile Parameters LOS Structures for each Cost Profile Parameters Length Structure, 4 Cost Profile Parameter Length Structures for each Cost Profile Parameters Truth Structure, and 2 Cost Profile Parameters Truth Structures. Thus, the system knows that the first Cost Profile Parameters LOS Structure is for LOS Code 1, the second for LOS Code 2, and so on, and that the first Cost Profile Parameters Length Structure is for 0-digits, the second for 5-digits, etc.

For example, consider a parameter setting that indicates correctcost=11,PO,0.02. This means that the cost of delivering a mail piece to a PO Box, when the arbitrator has applied a correct 9-digit PO Box ZIP Code, is $0.02. This information is stored in the Cost Profile Parameters Structure as follows: index to the first of the two Cost Profile Parameters Truth Structures, since the first is for correctly applied zip codes. Then index to the $3^{rd}$ Cost Profile Parameters Length Structure, since the $3^{rd}$ is for 9-digits. Next, index to the $4^{th}$ Cost Profile Parameters LOS Structure, since the LOS Code "PO" has a numerical equivalent of 4, as per Table 1.

Examples of parameters include, for instance: (a) the cost of arbitrating a mail piece to the correct 11-digit delivery point for each Level-of-Sort (LOS) code in the hierarchy; (b) the cost of arbitrating a mail piece to the correct 9-digit ZIP+4 for each LOS code in the hierarchy; (c) the cost of arbitrating a mail piece to the correct 5-digit zip code for each LOS code in the hierarchy; (d) the cost of arbitrating a mail piece to the incorrect 11-digit delivery point for each LOS code in the hierarchy; (e) the cost of arbitrating a mail piece to the incorrect 9-digit ZIP+4 for each LOS code in the hierarchy; (f) the cost of arbitrating a mail piece to the incorrect 5-digit zip code for each LOS code in the hierarchy; (g) the number of directory match modules; (h) the parameters to force or refuse acceptance of result from any directory match module; and (i) the parameter to indicate clearing of existing cost profile array.

An example of the parameter mentioned in (h) is a parameter setting that indicates that cost of using a PO Box result from directory match module #2 is $999,999,999.99. This parameter will cause the value $999,999,999.99 to be written directly into the Cost Profile Array for the particular LOS Code and DMM#. This, in effect, is a flag that indicates to never use such a result. Likewise, a value that indicates that cost of using a PO Box result from directory match module #2 is $0.00 is a flag indicating to always use the result, to the exclusion of other results. This parameter will cause the value $0.00 to be written directly into the Cost Profile Array for the particular LOS Code and DMM#.

An example of the parameter mentioned in (i) is a parameter which is used to control whether a new cost profile array is to be generated by the tuner, starting from scratch, of whether the previously existing cost profile array is to be adjusted based on additional truthed input. The parameters are stored in a Cost Profile Parameter Structure.

The cost profile parameters 14, as well as the truthed arbitration input 12, are only used for tuning. The parameters are stored in the parameter file 14, and can be updated or changed by the end user. The name of the file 14 is passed to the arbitrator 10 at run-time, in the "Open" function, which refers to starting the arbitrator.

Every 11-digit, 9-digit, and 5-digit zip code is part of a hierarchy defined by the USPS. There is a cost associated with correctly delivering to each hierarchical level, and incorrectly delivering to each hierarchical level. The cost for correctly delivering to each hierarchical level varies because if the delivery is not to the ultimate destination, additional cost is needed to get it there. The cost for incorrectly delivering to each hierarchical level varies because the further into the hierarchy that the error occurs, the lower the cost of correcting the error. For example, delivering to the wrong house, within the correct zone, is a less costly error than delivering to the wrong zone. Every element in a hierarchy is represented by an LOS code.

The cost profile parameters are stored in the parameter file 14 in accordance with a unique parameter syntax (or format). The basic syntax of each parameter setting is <parameter name>=<value string>. Parameter syntax is described for the parameters correctcost, incorrectcost, nDirectoryLookupUnits, neveruse, and alwaysuse.

The correctcost parameter reflects the cost of correct delivery of an mail piece, and has a syntax of correctcost=<# digits>,<los>,<cost>, where "# digits" is an integer which represents the number of digits in the zip code, LOS is a 2-digit string, and "cost" is a floating point number. Thus, the parameter correctcost=11,ST,0.06 indicates that the cost of correct delivery of an 11-digit piece coded to Street LOS is $0.06. It should be noted that the actual contents, i.e., "correctcost=11,ST,0.06" is considered to be run-time data contents, that is, existing at the time the arbitrator is actually used, rather than at the time the arbitrator is constructed.

The incorrectcost parameter reflects the cost of incorrectly delivering a mail piece, and has a syntax of incorrectcost=<# digits>,<los>,<cost>, where "# digits" is an integer, LOS is a 2-digit string, and "cost" is a floating point number. Thus, the parameter incorrectcost=11,ST, 1.17 means that the cost of incorrect delivery of an 11-digit piece coded to Street LOS is $1.17.

It is further noted that the correctcost and incorrectcost parameters are related to hierarchy in that the cost of correctly delivering a piece of mail varies depending on which of the hierarchical zip codes is placed on the mail piece. If the correct zip code for a street is on the mail piece, the carrier must spend time manually sorting it to the right building. But if the building zip code is already on the mail piece, that manual labor is spared, therefore the correctcost of delivering to a building is lower than to a street. Likewise, the incorrect cost of delivering to a building is lower than to a street—if the zip code is correct for the street, but incorrect for the building, the carrier can solve the problem without involving other carriers. But if it's incorrect for the street as well, it might have to go to another carrier—hence the higher cost.

The costs for correctcost need not be determined for sending from every zip code to every other zip code and the costs for incorrectcost need not be determined for sending from every zip code to every other zip code. Rather, the costs can be constrained, such as for 3-digit errors, 5-digit errors, 9-digit errors, and 11-digit errors. For example, the average cost can be known for sending a mail piece from Washington to the wrong city, irregardless of whether that wrong city is Baltimore, or Los Angeles.

The nDirectoryLookupUnits parameter reflects the number of lookup engines present, and has a syntax of nDirectoryLookupUnits=#, where # is an integer stating how many DMMs are present, such as nDirectoryLookupUnits=12. At "Open" time, this value (e.g. 12) is stored in the "Number of DMMs" field in the Cost Profiles Parameter Structure and is used by both the tuner and the controller to determine how many DMM Result Structures are present in the Mail Piece Result Structure.

The neveruse parameter sets conditions which, if met, dictate that the results not be used. The neveruse parameter has a syntax of neveruse=<directorylookupunit#>,<LOSCode>, qualitylow,qualityhigh, where directorylookupunit# is an integer stating the number of DMM to ignore, LOSCode is a string code specifying which codes to ignore, "" means all or any, and qualitylow and qualityhigh are integers stating the range of quality levels to ignore. For instance, the parameter neveruse=3,PO,0,100 means to never use PO box results from directory match module #3; neveruse=8,,0,100 means never use ANY results from lookup engine 8; and neveruse=5,ST,0,60 means never use STREET results from directory match module 5, if the quality is in the range of 0 to 60. The neveruse parameter will cause the value of $999,999, 999.99 to be written into the cost profile array for the particular LOS Code, DMM#, and quality values.

The alwaysuse parameter sets conditions which, if met, dictate that the results always be used. The alwaysuse parameter has a syntax of alwaysuse=<directorylookupunit#>, <LOSCode>,qualitylow,qualityhigh, where directorylookupunit# is an integer stating the number of directory match module to prefer, LOSCode is a string code specifying which codes to prefer, "" means all or any; and qualitylow and qualityhigh are integers stating the range of quality levels to prefer. For instance, the parameter alwaysuse=3,PO,0, 100means always use PO box results from directory match module #3 as the final answer; alwaysuse=8,,0,100 means always use ANY results from directory match module 8 as the final answer; and alwaysuse=5,ST,0,60 means always use STREET results from directory match module 5, if the quality is in the range of 0 to 60. The alwaysuse parameter will cause the value of $0.00 to be written into the cost profile array for the particular LOS Code, DMM#, and quality values.

Cost Profile Array 18

The cost profile array 18 is a statistical cost profile for each input source (i.e., the particular directory match module). The cost profile array 18 is used by the arbitration controller 22 to make arbitration decisions. The cost profile array 18 is a data content, (i.e., it contains data) that enables the arbitrator 10 to make a cost minimized decision by considering the statistical cost profile of each input source 20. The cost tuner 16 generates a cost profile for each directory match module, which is gathered together to form the cost profile array 18 for all the DMMs providing non-truthed input 20 to the arbitration controller 22.

In accordance with the preferred embodiment of the invention, the cost profile array 18 includes the average weighted cost (AWC) of delivering a mail piece to each LOS code and each zip code length for a given directory match module. Table 2 contains a hypothetical example of cost profile array 18, which includes entries for the DMM quality (or confidence), the AWC to deliver a mail piece, and the number of mail pieces used to derive that cost.

The data in the cost profile array 18 (i.e., the confidence, AWC, and number of mail pieces) is sorted by LOS and zip code length for each DMM. The information in the cost profile array 18 is for n-directory match modules.

Within each LOS, the costs are further categorized by a quality value. Quality values ranges from 0 to 100, and is part of the UCMA arbitration data format, namely the ZIP Code Result Structure (FIG. 3). Quality values are assigned by the DMMs to indicate its confidence in the correctness of its result. The basis of the assignment is not critical, though preferably each DMM applies a consistent quality rating within its results. A separate AWC is calculated at each quality value point, and for all quality values. In the example of Table 2, the confidence, AWC, and number of pieces is listed for delivering a mail piece to the LOS for "firm" provided by the DMM# 1 with a quality of 0, 1 and 100.

TABLE 2

Example of a Section of a Cost Profile Array
Cost Profile Length Structure for 11-digit Zip Codes

| Level of Sort | DMM #1 | | | | DMM #2 | DMM #n |
|---|---|---|---|---|---|---|
| Firm | Quality | # correct pieces | # incorrect pieces | AWC | etc. | Etc. |
| | 0 | 156 | 904 | $2.33 | | |
| | 1 | 188 | 232 | $2.19 | | |
| | ... | ... | ... | ... | | |
| | 100 | 435 | 38 | $0.06 | | |
| Apartment | etc. | | | | etc. | Etc. |
| Building | etc. | | | | etc. | Etc. |
| Street | etc. | | | | etc. | Etc. |
| Zone | etc. | | | | etc. | Etc. |
| 5-digit default | etc. | | | | etc. | Etc. |
| PO BOX | etc. | | | | etc. | Etc. |

TABLE 2-continued

Example of a Section of a Cost Profile Array
Cost Profile Length Structure for 11-digit Zip Codes

| Level of Sort | DMM #1 | DMM #2 | DMM #n |
|---|---|---|---|
| RR BOX | etc. | etc. | Etc. |
| Postmaster | etc. | etc. | Etc. |
| General Delivery | etc. | etc. | Etc. |
| Foreign | etc. | etc. | Etc. |

The number of correct mail pieces and number of incorrect mail pieces are retained in the cost profile array 18 for the tuner 16 to be able to accurately determine the AWC every time an additional truthed mail piece is input 12.

Special control values are assigned to trigger special actions by the arbitrator 10. For instance a cost of $999,999,999.99 can be assigned to indicate that this type of result should never be used from this directory match module for the given LOS Code and quality. A cost of $0.00 can be assigned to indicate that this result should be used as the final result and ignore all results from all other directory match modules.

Cost Profile Array Format

FIG. 5 shows the unique data format for the cost profile array 18. The cost profile array 18 includes the following fields: Cost Profile Length Structure (4 instances), Cost Profile DMM Structure (16 instances per Cost Profile Length Structure, for a total of 48 instances), Cost Profile LOS Structure (22 instances per Cost Profile DMM Structure for a total of 1056 instances) and Average Weighted Cost Structure (101 instances per Cost Profile LOS Structure for a total of 105600 instances).

The AWC Structure is the Average Weighted Cost for a particular directory match module, LOS Code and quality. The AWC includes the Cost (i.e., the AWC) and the number of mail pieces used to calculate the Cost. The Cost is expressed as a 32-bit integer, and is repeated 101 times, once for each Quality of 0-100. The system recognizes that the first AWC Structure is for quality 0, the second for quality 1, etc. The Cost Profile LOS Structure stores all of the AWC Structures, which is repeated for qualities 0-100, for a particular DMM, LOS Code and a particular ZIP Code length. Thus, the first Cost Profile LOS Structure is for LOS Code 1, the second for LOS Code 2, etc., so that the Cost Profile LOS Structure consists entirely of the 101 AWC Structures. The Cost Profile LOS Structure is repeated 22 times, once for each LOS Code 1-22.

The Cost Profile DMM Structure stores all of the Cost Profile LOS Structures, for LOS Codes 1-22, for a particular DMM and particular ZIP Code length. Thus, the first Cost Profile DMM Structure is for first DMM, the second for the second DMM, etc. The Cost Profile DMM Structure is repeated 16 times, once for each of the DMMs #0-# 15. The Cost Profile Length Structure stores all of the Cost Profile DMM Structures, for DMMs #0-#15, for a particular length of zip code. The Cost Profile Length Structure is repeated for each of the zip code lengths O-digit, 5-digit, 9-digit, and 11-digit. Finally, the Cost Profile Array contains four instances of the Cost Profile Length Structure, one for each of the zip code lengths.

For example, the Average Weighted Cost for delivering a mail piece that was coded to an 11-digit PO Box, by lookup engine 3, with a confidence of 97, would be stored in the 98th Average Weighted Cost Structure, within the fourth Cost Profile LOS Structure, within the third Cost Profile DMM Structure, within the Cost Profile Length Structure for 11-digit zip codes. It should be noted that the Cost Profile Array format refers to the organization of input values according to the above structures. In practice, the Cost Profile array can be expressed in most computer languages as a 4-dimensional array, with zip code length representing the first dimension, DMM # representing the second dimension, LOS Code representing the third dimension, and quality representing the fourth dimension.

Operation of the Cost Tuner 16

FIGS. 6 and 7 show the detailed operation of the cost tuner 16. The purpose of the cost tuner 16 is to build and update the cost profile array 18 based upon the truthed data from input 12. The truthed data 12 and the cost profile parameters 14 supply the information needed for the tuner 16 to determine the AWC for the truthed mail pieces. The AWC is then used to build the cost profile array 18.

The tuner 16 derives the AWC from a composite of the truthed data 12 having correct delivery and incorrect delivery costs. The cost profile is constructed based upon the AWC for the truthed data for each directory match module that generates a final ZIP Code. The AWC is determined by retrieving the costs to correctly and incorrectly send the mail piece from the Cost Profile Parameters 14. Each truthed mail piece input 12 indicates the quality and LOS for that mail piece, which is then used to calculate the AWC for the LOS and quality associated with that truthed mail piece.

Thus, if the truthed mail piece has a confidence rating of 1 for the LOS firm, the AWC can be calculated for that mail piece based upon the known costs from the Cost Profile Parameters 14. If there are a limited number of data points in the truthed arbitration input 12, the cost tuner 16 interpolates the AWC for the missing quality values (from 0-100) for the Directory Match Module. Alternatively, the missing quality values of the CPA can be left empty, and the controller 22 can interpolate any values as needed.

For example, assume that the cost of delivering a mail piece correctly to an 11-digit street address is $0.06, which is user-defined and can be based upon the distance traveled by the mail piece, i.e., origination and destination zip codes, or an average cost. Assume further that the cost of misdelivering a mail piece is $1.82. Misdelivery refers to the delivery of a mail piece to an incorrect address.

Next, assume that when the directory match module that generated the zip code result delivers mail to 11-digit street addresses, it is correct 95.3% of the time and incorrect 4.7% of the time, i.e., it has a 4.7% error rate. The correct rate is defined as the number of correct pieces in a particular AWC element of the Cost Profile Array, divided by the sum of the number of correct pieces and incorrect pieces. in a particular AWC element of the Cost Profile Array.

The incorrect rate is defined as the number of incorrect pieces in a particular AWC element of the Cost Profile Array, divided by the sum of the number of correct pieces and incorrect pieces in a particular AWC element of the Cost Profile Array. The cost tuner retains the number of correct and incorrect zip codes determined from the truthed mail pieces in the CPA, so that the arbitrator 10 can determine the correct rate and error rate (e.g. 95.3% and 4.7%).

The average weighted cost is set forth in Equation 1 as the rate of correct delivery multiplied by the cost to correctly deliver the mail piece, added to the rate of incorrect delivery multiplied by the cost to handle the incorrectly delivered mail piece. Thus, in our example, the AWC is AWC=(95.3%× $0.06)+(4.7%×$1.82), which equals $0.1427, or approximately 14 cents.

AWC=(rate of correct delivery*cost to correctly deliver)+(rate of incorrect delivery*cost to incorrectly deliver)     Equation 1—Average Weighted Cost The AWC is expressed as a dollar and cents figure, and shall be no less than $0.00. The upper threshold, above which the mail piece is not to be delivered but instead returned to sender, is set by the end user (i.e., the USPS) as the neveruse parameter. The cost profile array 18 is determined at run-time, and has a unique cost profile array format.

The cost tuner 16 starts by checking a file for a previously generated Cost Profile Array 18, step 30. If a previous Cost Profile Array 18 is located, it is loaded into the cost tuner 16, step 31. Loading of the previously existing Cost Profile Array 18 is controlled by a variable passed to the cost tuner 16, which is recognized at step 30. The arbitrator 10 will either use the previously existing CPA or not, depending on the wishes of the user implementing the UCMA 10, as expressed by a variable passed to UCMA, as represented by the Erase Prior CPA field in the Cost Profile Parameter Structure of FIG. 4.

The tuner 16 then loads the user defined Cost Profile Parameters from a file 14, step 32. At step 33, the tuner 16 then sets a variable 'e' to zero to indicate which DMM Result Structure is being examined within the Mail Piece Result Structure (see FIG. 3). There are preferably up to 16 DMM Result Structures, indexed from 0 to 15, within the Mail Piece Result Structure. The tuner 16 then sets a variable 'z' to indicate which ZIP Code Result structure is being examined within the DMM Result Structure, step 34. There are preferably up to 16 ZIP Code Result Structures, indexed from 0 to 15, within the DMM Result Structure.

Continuing with step 35, the tuner 16 reads the truthed input data 12. The tuner 16 reads the ZIP Code, LOSCode and quality from the ZIP Code result indexed by 'z' in the array of ZIP Code Results in the current DMM that is being indexed by 'e' in the array of DMM Results in the Mail Piece Result Structure. At step 36, the # of correct pieces, and # of incorrect pieces are retrieved from the Cost Profile Array for the quality, LOSCode, current DMM indexed by 'e', and length of ZIP Code. A test is made at steps 37 and 38 of the correctness of the ZIP Code result from the DMM by comparing the ZIP Code result to the "truth" ZIP Code Result in the Mail Piece Result Structure.

If the ZIP Code and LOS Code pair of step 38 match a ZIP Code and LOS Code pair in the "truth" ZIP Code, then the ZIP Code and LOS Code are considered correct. In step 38, if the ZIP Code and LOS Code are considered correct, the correct # of pieces is incremented, and stored back in the CPA, step 39.

If, on the other hand, the ZIP Code and LOS Code pair do not match the ZIP Code and LOS Code pair in the "truth" ZIP Codes, then the ZIP Code and LOS Codes are considered to be incorrect. In step 38, if the ZIP Code and LOS Code are considered incorrect, the incorrect # of pieces is incremented, and stored back in the CPA, step 40.

Steps 41-46 are used to calculate the AWC for the cost profile array 18, and are repeated for each zip code result of each DMM received as truthed input 20. In step 41, the correct # of pieces and incorrect # of pieces are added together to get the total number of pieces. In step 42, the correct # of pieces is divided by the total # of pieces to get the 'correctrate'. In step 42, the incorrect # of pieces is divided by the total # of pieces to get the 'incorrectrate'.

At steps 44 and 45, the 'correctcost' and 'incorrectcost' are read, respectively, from the Cost Profile Parameters Truth Structure 14 for the correctly and incorrectly applied zip codes, by indexing into the Cost Profile Parameters Length Structures, based on length of ZIP Code, then into the Cost Profile Parameters LOS Structure based on LOS Code.

At step 46, the Average Weighted Cost is calculated, in accordance with Equation 1 above. At step 47, this new Average Weighted Cost is stored back into the Cost Profile Array 18 by indexing according to quality, LOS Code, DMM # ('e'), and length of ZIP Code. At step 48, the tuner 16 increments the value for the variable 'z' to point to the next ZIP Code Result in the array of ZIP Code results for the current Directory Match Module Structure.

The tuner 16 then determines whether there are still ZIP Code results to be examined by comparing the current DMM 'z' to the number of zip codes nZips, step 49. If there are still ZIP Code results to be examined, the tuner 16 returns to step 35, where it proceeds to update the AWC based upon the new ZIP Code result. Otherwise, at step 50, the tuner 16 increments the value for the variable 'e' to point to the next Directory Match Module Result Structure in the array of Directory Match Module Result structures in the current Mail Piece Structure.

At step 51, the tuner 16 determines if there are additional DMM Results in the truthed input 12. If there are still Directory Match Module Result structures to be examined, the tuner returns to step 34. Step 34 resets the number of ZIP Code results to zero, and then the tuner 16 proceeds to update the AWC based upon the ZIP Code results for the new DMM. Otherwise, the tuner 16 has cycled through all of the ZIP Code Results for each of the DMMs, so that the tuning function for the current mail piece is complete.

The result of the above process is that the tuner 16 has determined an AWC for the truthed data. The AWC is formed into a table according to the LOS, DMM, number of digits of the ZIP codes and quality. That table is a new or updated Cost Profile Array 18 which is based upon each Mail Piece Result containing "truth" data that is passed to it.

Arbitration Controller 22

The arbitration controller 22 receives the cost profile array 18 generated by the cost tuner 16, and a non-truthed input 20. The non-truthed input 20 to the arbitrator refers to the data contents passed to the arbitrator 10 when the arbitrator 10 is in use to arbitrate among several answers from the DMMs. The truthed input 12, in contrast, is only used to tune the cost profile array 18. The non-truthed input 20 is provided in the same data structure as the truthed input 12, referred to as the UCMA arbitration data format.

The arbitration controller 22 arbitrates the non-truthed input 20 in accordance with an arbitration formula in a series of calculations combined with logic to determine all possible answers (up to 16) from each input source. The arbitration formula finds the zip code result that has the lowest likely cost of delivery, in the cost profile array 18. The input 20 has a ZIP Code length, DMM #, LOS Code, and quality associated with the zip code result. The arbitration controller 22 finds the AWC for the ZIP Code length, DMM #, LOS Code, and quality in the cost profile array 18, and bases the output 24 upon the lowest AWC for that mail piece. For example, if there is an 11-digit zip code result from Directory Match Module # 1, with an LOS Code of "FF" (for firm), and a quality of 100, then the AWC for that result is $0.06 (from the cost profile array 18 shown in Table 2 above).

Operation of Arbitration Controller

FIGS. 8-9 show the operation of the arbitration controller 22 in accordance with the arbitration formula. Beginning at step 52, the controller 22 sets the variable 'bestResultCost' for every LOS Code to a control value, such as $999,999,999.99, which indicates that there is not yet a cost associated with the mail piece result for this LOS Code. Additionally, the value $999,999,999.99 serves as a useful initialization since any costs that are found will certainly be less than this figure. The 'bestResultCost' is implemented as an array of 22 items, indexed by the LOS Code.

At step 53, the variables 'bestResultDMMIndex' and 'bestResultZIPIndex' for each LOS code are then set to −1. The 'bestResultDMMIndex' and 'bestResultZIPIndex' are implemented as arrays of 22 items, indexed by the LOS Code. The variable 'e' for the current DMM being examined (possibly 0 through 15) and the variable 'z' for the current ZIP Code Result being examined (possibly 0 through 15) are set to zero, steps 54, 55. The variable 'e' is used to iteratively access the Directory Match Module Result structures in the Mail Piece Result Structure. The variable 'z' is used to iteratively access the ZIP Code Result Structures in each Directory Match Module Result Structure.

Steps 55-65 check for the lowest AWC amongst all the ZIP Code results for all the DMMs, for each LOS Code. Steps 64-65 are used to cycle through the DMMs until all DMMs have been examined, and steps 62-63 are used to cycle through the ZIP Code results for each DMM until all results for each DMM have been examined.

At step 56, the UCMA accesses the ZIP Code, LOS Code, carrier route, and quality for the ZIP Code Result Structure at index 'z' in the array of ZIP Code Result Structures within the Directory Match Module Result Structure, and at index 'e' in the array of Directory Match Module Result Structures within the Mail Piece Result Structure (FIG. 3). It then determines the length of the ZIP Code (0, 5, 9 or 11 digits).

At step 57, the controller 22 then accesses the Cost Profile Array 18 to find the AWC for the given ZIP Code length, DMM # ('e'), LOS Code, and quality. For example, in the embodiment of Table 2 above, if the current result from DMM #1 being examined is 22030-2512-99 (i.e. 11-digits in length), with an LOS Code of "FF" (for firm), and a quality of 1, the AWC is $2.19. If the AWC is zero, step 58, then the controller 22 skips to step 66 since there can be no lower cost. Otherwise, the controller 22 must determine whether the AWC is the lowest for that LOS Code, and the system continues at step 59.

At step 59, the controller 22 compares the AWC read from the cost profile array 18 to the 'bestResultCost' for the particular LOS Code. If the AWC is lower, then it replaces the 'bestResultCost' for the particular LOS Code with the AWC for the present DMM, step 60. The controller 22 also replaces 'bestResultDMMIndex' with the variable 'e', which identifies the present DMM, and 'bestResultZIPIndex' with the variable 'z' which identifies the present Zip Result Structure in the present DMM Result Structure, step 61. Thus, as the UCMA 10 proceeds through all ZIP Code results for all DMM's within a particular Mail Piece result, it identifies the DMM providing the lowest cost result for each particular LOS Code.

UCMA next increments 'z' to look at the next ZIP Code Result within the Directory Match Module Result structure, step 62, and compares the ZIP Code Result to the number of ZIP Code result structures available, step 63. If there are still ZIP Code results, the UCMA proceeds back to step 56, where it determines whether the AWC for the next ZIP Code result for the DMM is lower than the 'bestResultCost'. Otherwise, if there are no more ZIP Code results within the current Directory Match Module Result, the controller 22 proceeds to step 64.

At step 64, the controller 22 increments the value for variable 'e' to look at the next Directory Look Unit Result within the Mail Piece Result Structure. It then compares the DMM number 'e' to the number of Directory Look Unit Result structures available, step 65. If there are still DMM results available, the controller 22 proceeds back to step 55, where it cycles through all the ZIP Code results for the next DMM to determine whether the AWC for any of the ZIP Code results is lower than the bestResultCost'. Otherwise, the operation proceeds to step 66, which is shown in FIG. 9.

The result of steps 56-61 is to build an array for bestResultCost, bestResultDMMIndex and bestResultZIPIndex. An example of these arrays is shown in FIG. 10. Steps 55-65 check for the lowest AWC amongst all the ZIP Code results for all the DMMs, for each LOS Code. Steps 64-65 are used to cycle through the DMMs until all DMMs have been examined, and steps 62-63 are used to cycle through the ZIP Code results for each DMM until all results for each DMM have been examined. The lowest AWC for each LOS Code is stored in the array of bestResultCost, step 60, and the associated bestResultDMMIndex and bestResultZIPIndex is noted in their respective arrays, step 61.

Accordingly, at this point in the process, the controller 22 has identified which Directory Match Module has provided the lowest cost ZIP Code result for each LOS Code. The controller 22 now determines which ZIP Code result amongst the various LOS Codes is the lowest cost result, since only one zip code can be applied to the mail piece. To start this process, it initializes the 'overallBestResultCost' to $999,999,999.99, step 66.

At step 67, the controller 22 initializes a variable 'c' to loop through the 'bestResultCost' array for each LOS Code. At step 68, the arbitration controller 22 determines if the cost was $0.00. If so, it proceeds to step 74, since a cost of $0.00 is always taken as the overallBestResultIndex. If not, it compares the 'bestResultCost' for the current LOS code to the 'overallBestResultCost', step 69.

If the 'bestResultCost' is not lower than the 'bestResultCost', the controller 22 proceeds to step 72 to examine the 'bestResultCost' for the next LOS Code. Otherwise, if the bestResultCost' is lower than the overallBestResultCost', the controller 22 sets the 'overallBestResultCost' to the 'bestResultCost', step 70. It then sets 'overallBestResultIndex' to the LOS Code that is associated with the particular locations in the 'bestResultDMMIndex' array and the 'bestResultZIPIndex' array, step 71.

At step 72, the controller 22 increments the value for variable 'c' to look at the 'bestResultCost' for the next LOS Code. If there are no more 'bestResultCost' values to examine, step 73, the operation proceeds to step 74, otherwise it returns to step 68 for the next LOS Code.

At steps 74 and 75, the controller 22 uses the 'overallBestResultIndex' to access a particular element of the 'bestResultDMMIndex' array and 'bestResultZIPIndex' array. The bestResultCost is an array of the best results for each of the LOS codes, i.e., best firm result, best street result, etc. The overallBestResultIndex is the index into that array which indicates the best result overall. The overallBestResultIndex is used to index the array of bestResultDMMIndex to get an index of the best zip code for the best DMM, step 74. The overallBestResultIndex is also used to index the array of bestResultZIPIndex to get an index of the best zip code for the best DMM, step 75.

The elements returned at steps 74 and 75, in turn, are used to find the particular DMM Result Structure in the Mail Piece Structure and the particular Zip Code Result Structure in the particular DMM Result Structure (FIG. 10). The zip code is output as the arbitration output 24 for the arbitration controller 22 of the arbitrator 10.

An example of the indexing performed at steps 74-76 of FIG. 9 is shown in FIG. 10. The processing from steps 52-65 results in a bestResultCost array, bestResultDMMIndex array, and a bestResultZIPIndex array, which respectively provide the best cost for each DMM, and the DMM and zip code index for that best cost. Those arrays are shown in the top table of FIG. 10. In our example, the overallBestResultIndex obtained from steps 52-65 is for an LOSCode of 4, meaning that the lowest zip code cost result was for a P.O. Box.

The bestResultDMMIndex array is then used to determine which DMM contained the P.O. Box result (since more than one might contain a P.O. Box result). The bestResultZIPIndex array is then used to find which zip code was the P.O. Box result with the lowest cost within that DMM, since within one DMM there could be multiple results with the same LOS Code, i.e., multiple P.O. Box results.

The AWC of $0.02 is retrieved for the LOS Code of 4, and for DMM Result Structure #1, and zip #1. That information is used to retrieve the final zip code from the Mail Piece Result Structure. A Mail Piece Result Structure is represented by the bottom table of FIG. 10. It should be noted that the Mail Piece Result Structure has been abbreviated to only depict the various ZIP Code entries, and the other fields have been removed for illustrative purposes only.

The bestResultDMMIndex of 1 indicates that the system is to retrieve the zip code located in DMM Result Structure #1 from the Mail Piece Result Structure. The bestResultZIPIndex of 0 indicates that the system is to also retrieve the zip code result located in the first slot of the DMM #1 from the ZIP Code Result Structure. Accordingly, the arbitration output 24 is in the format of the mail piece result structure, where the ZIP Code is 11111-7878-12, which is returned to the mail automation main computer or similar system for applying as a physical bar code to a mailpiece.

It is noted that, in accordance with the preferred embodiment of the invention, steps 52-65 identify which Directory Match Module has provided the lowest cost ZIP Code result for each LOS Code, and steps 66-76 identify which LOS Code has the lowest cost. Alternatively, it is appreciated that the controller 22 need not first identify the lowest cost according to LOS Code. Instead, the controller 22 can identify the lowest cost across all LOS Codes in a single cycle of the ZIP Code results of all the DMMs.

The UCMA 10 does not require any party other than the end-user to have access to information that is proprietary to the owner of the DMM. That is, the arbitrator 10 can be tuned by the end-user and need not be tuned by the developers and re-sellers of the arbitrator 10. Instead, the UCMA 10 operates based upon information about the mail piece, and parameters defined by the end user (i.e., the USPS). Thus, the UCMA 10 is dynamically optimized to automatically adjust to any directory match module, and upgrades thereto. The arbitrator 10 is tuned to costs, and not to specific mail equipment. The use of dynamic cost information about each directory match module allows the arbitrator 10 to be continually and dynamically optimized. Hard-coded logic is not required to handle arbitration anomalies. For instance, all PO Box answers from a particular lookup unit can be rejected by use of parameterized information.

In addition, the arbitrator 10 can be tuned to cost rate information by the end user (i.e., the USPS), and the developers and re-sellers of the arbitrator 10 do not have to have access to proprietary cost or error rate information about third party mail equipment. Furthermore, the arbitrator 10 is updated based upon the costs themselves to continually and dynamically adjust the arbitration formula of the cost profile array. Thus, the arbitrator 10 need not be updated for specific mail equipment by calculating costs for that equipment and translating that cost into updated rules.

The arbitration controller 22 has an arbitration output 24 based upon the cost profile array 18 as applied to the non-truthed arbitration input 20 as a result of the arbitration formula. The actual contents of the output are a subset of the contents of the input of the lowest cost lookup DMM and LOS code as determined by the cost profile array 18 and arbitration formula of the arbitration controller 22. It is a subset since even though the result from one particular lookup engine is chosen as the lowest cost, the result from that lookup engine may have several zip codes, some of which may be discarded as too costly. The output is represented in the UCMA arbitration data format.

Programming Considerations

The arbitrator 10 is preferably implemented by a processor, such as in a standalone or networked computer or server with a storage device for storing the cost profile parameters 14 and the cost profile array 18. The processor directly or wirelessly is connected to communicate with the directory match modules. Thus, the arbitrator 10 is able to receive the non-truthed arbitration input 20, and transmit the arbitration output 24, to/from the mail processing equipment. The operation of the tuner 16 and controller 22 can be implemented on the processor as a set of one or more subroutines, written in a portable computer language, e.g. C or Java.

The arbitrator 10 has various functions, including open, arbitrate, report and close. The open function loads the cost profile array 18 and clears all internal statistics. This function allows for a parameter that indicates whether to preserve the existing cost profile array or clear it out and create a new one. It also allows for specifying the name of the parameter/configuration file and the file containing the current cost profile array.

The arbitrate function performs an arbitration of multiple results for a particular mail piece. The report function provides summary statistics about all mail pieces that have been arbitrated since the last initialize operation. The close function saves the cost profile array and clears all internal statistics. This function recognizes a parameter that indicates the cost profile array should not be saved. These operations can be callable subroutines, or methods of an object.

The arbitrator 10 supports up to about 16 lookup units and up to 16 zip codes in each result from each lookup unit. However, any suitable number of lookup units can be supported by the arbitrator 10. In addition, the invention can be implemented in any country and can be used for sorting mail being sent to foreign countries. Thus, the present invention need not use a zip code formatted in accordance with U.S. practice, but can instead use postal codes of other countries.

Though the preferred embodiment of the invention utilizes the cost profile array to determine an optimum result, the cost need not be taken into consideration. Instead, the arbitrator 10 can use an error profile array that describes an error rate for each LOS code and each zip code length for a given directory match module. The error rate is then established by an error analysis of mail piece results for a given directory match module. In addition, the cost need not be a cost that is weighted to account for the cost of incorrectly and correctly delivering a mail piece.

In addition, the present invention can take cost models into account in arbitrating mail pieces. The USPS, for instance, has a cost model which is used by USPS for measuring the cost benefit of different DMMs. That cost model can be represented in the parameters 14 and in the CPA 18. Thus, the cost profile parameters 14 and the CPA 18 can represent any particular cost model, such as the USPS Cost Model. The USPS Cost Model would be used to derive the "correctcost" and 'incorrectcost' parameter values.

The foregoing description and drawings should be considered as illustrative only of the principles of the invention. The invention is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

I claim:

1. A system comprising:
    a memory;
    a processor coupled to the memory, said processor functioning as an arbitrator for use with a plurality of modules each having a same input and a zip code result as its output, the result of one of the plurality of modules differing from the result of a different one of the plurality of modules, the arbitrator comprising:
        a cost tuner for determining a different cost profile associated with each one of the plurality of modules to form a cost profile array, wherein the cost profile includes a cost associated with each one of the results and the cost is determined based upon a rate of which the result is correct, a correct result cost if the result is correct, a rate of which the result is incorrect, and an incorrect result cost if the result is incorrect; and
        a controller for determining an optimum result from among the results, the controller utilizing the cost profile array from said cost tuner to determine the optimum result.

2. The system of claim 1, wherein each of the results is associated with a quality assigned by each of the plurality of modules, and the cost is based on the quality for the one of the results.

3. The system of claim 1, wherein the cost is based upon a level-of-sort for each of the plurality of modules.

4. The system of claim 1, wherein the plurality of modules implement character recognition and directory lookup functions, and each of the results are zip codes for a mail piece.

5. The system of claim 1, wherein said cost tuner has an input for receiving truthed data, said cost tuner determining the cost profile array based upon the received truthed data.

6. The system of claim 1, wherein said cost tuner has an input for receiving user-defined parameters.

7. The system of claim 6, wherein said user-defined parameters include the cost for using the result if the result is correct, and the cost of using the result if the result is incorrect.

8. The system of claim 1, wherein said controller has an input for receiving the results from the plurality of modules and each of the results is based upon a same data input to each of the plurality of modules.

9. The system of claim 8, wherein the input includes a level-of-sort field.

10. The system of claim 1, wherein the cost profile array is based upon an error rate for each of the plurality of modules.

11. The system of claim 1, wherein the cost profile array includes a confidence value based on a predicted correctness of the type of result associated with each of the plurality of modules.

12. The system of claim 1, wherein the result is correct if the result matches the input and the result is incorrect if the result does not match the input.

13. The system of claim 1, wherein each of the plurality of modules determines the result based on a same-function that attempts to determine a correct result.

14. The system of claim 1, wherein the results are unrelated to cost.

15. The system of claim 2, wherein the quality indicates a level of confidence associated with the one of the plurality of results.

16. The system of claim 3, wherein the level-of-sort indicates the extent of detail for each of the plurality of results provided by the plurality of modules.

17. The system of claim 11, wherein the type of result is one of a state, street, post office box, or firm address.

18. A system comprising:
    a memory
    a processor coupled to the memory, said processor functioning as a universal cost-minimizing mail arbitrator for use with a plurality of character recognition and directory lookup processors, each directory lookup processor having at least one zip code result for a mail piece, the arbitrator comprising:
        a cost tuner having a truthed arbitration input for a truthed mail piece including a zip code result, a quality rating for the zip code result, a level-of-sort, and a truthed zip code result, said cost tuner further having a cost profile parameter file including cost profile parameters, said cost tuner determining a cost profile for each of the plurality of character recognition and directory lookup processors to form a cost profile array, wherein the cost profile includes, for the character recognition and directory lookup processor, a cost associated with the quality rating and level-of-sort, the cost being based upon the truthed arbitration input and the cost profile parameter filed wherein the cost profile includes a zip code cost associated with each one of the zip code results and the zip code cost is determined based upon a rate of which the zip code result is correct, a correct result cost if the zip code result is correct, a rate of which the zip code result is incorrect, and an incorrect result cost if the zip code result is incorrect; and an arbitration controller receiving the cost profile array from said cost tuner, and having a non-truthed arbitration input for the mail piece including the zip code result from the character recognition and directory lookup processor, a quality rating for the zip code result, and a level-of sort, said arbitration controller determining an optimum zip code result from among the plurality of zip code results for the mail piece, the optimum result based upon the cost profile array from said cost tuner.

19. The system of claim 18, wherein the cost parameters include the cost of sending a mail piece to a correct delivery point associated with a correct zip code and the cost of sending a mail piece to an incorrect delivery point associated with an incorrect zip code.

20. The system of claim 1, wherein the cost profile array includes a confidence value based on a predicted correctness of the type of result associated with each of the plurality of modules.

21. A system comprising:

a memory;

a processor coupled to the memory, said processor functioning as an arbitrator for arbitrating zip code results from a plurality of modules, the arbitrator comprising:

a cost profile array having a different cost associated with each of the plurality of modules, wherein the cost profile array includes a cost associated with each one of the results and the cost is determined based upon a rate of which the result is correct, a correct result cost if the result is correct, a rate of which the result is incorrect, and an incorrect result cost if the result is incorrect, and an arbitration controller having an input for receiving the results from the plurality of modules, said arbitration controller determining an optimum result from among the plurality of results utilizing said cost profile array.

22. The system of claim 21, wherein each of the plurality of results is associated with a quality, and the cost is based on the quality for each of the results, and the arbitration input includes the quality for each result, and wherein said arbitration controller determines an optimum result based upon the cost in the cost profile array associated with the quality for the result received by the arbitration input.

23. The system of claim 21, wherein the cost is based upon a level-of-sort for each of the plurality of modules, and the arbitration input includes a level-of-sort for each result, and wherein said arbitration controller determines an optimum result based upon the cost in the cost profile array associated with the level-of-sort for the result received by the arbitration input.

24. The system of claim 21, wherein the plurality of modules are character recognition and directory lookup processors and the plurality of results are zip codes for a mail piece.

25. The system of claim 21, wherein the results are unrelated to cost.

26. The system of claim 22, wherein the quality indicates a level of confidence associated with each result.

27. A system comprising:

a memory;

a processor coupled to the memory, said processor functioning as a cost tuner for establishing a cost for delivering a mail piece to a zip code for use by a processor functioning as an arbitrator, the cost tuner comprising a truthed arbitration input for receiving a plurality of zip code results and a plurality of truthed zip code results associated with a character recognition and directory lookup processor, said cost tuner generating a cost profile for the character recognition and directory lookup processor, wherein the cost profile includes a cost associated with delivering the mail piece to the zip code result, the cost being based upon the truthed arbitration input, wherein said cost tuner determines the cost based upon the rate of which the zip code result is correct, the cost of sending a mail piece to a correct delivery point associated with a correct zip code, the rate of which the zip code result is incorrect, and the cost of sending a mail piece to an incorrect delivery point associated with an incorrect zip code.

28. The system of claim 27, further comprising a cost profile parameter file including cost profile parameters, wherein the cost is based upon the cost profile parameters.

29. The system of claim 27, wherein the truthed arbitration input includes a quality for each zip code result, and the cost is associated with the quality for each zip code result.

30. The system of claim 27, wherein the arbitration input includes a level-of-sort for each zip code result, and the cost is associated with the level-of-sort for each zip code result.

31. The system of claim 30, wherein the level-of-sort indicates the extent of detail for each of the results from the plurality of modules.

32. The system of claim 30, wherein the level-of-sort indicates the extent of detail for the zip code result.

33. A computer-implemented method for arbitrating a plurality of modules having a plurality of results, the method comprising:

determining via a computer, a different cost profile for each one of the plurality of modules to form a cost profile array, wherein the cost profile array includes a cost associated with each one of the results and the cost is determined based upon a rate of which the result is correct, a correct result cost if the result is correct, a rate of which the result is incorrect, and an incorrect result cost if the result is incorrect; and determining an optimum result from among the plurality of results by applying the cost profile array to each of the plurality of results.

34. The method of claim 33, wherein the cost profile array includes a cost associated with each of the plurality of results.

35. A system comprising:

a recognition module receiving an image and generating an output having characters representing the image;

a first module receiving the output from said recognition module, applying a first function to the output that attempts to determine a correct result and providing a first result;

a second module receiving the output from said recognition module, applying a second function to the output that attempts to determine the correct result, and providing a second result, wherein the second result differs from the first result:

a cost tuner for determining a first cost profile for said first module and a second cost profile for said second module, wherein the first and second cost profiles include a respective first and second cost associated with the first result and the first and second cost is each determined based upon a rate of which the respective first and second result is correct, a correct result cost if the respective first and second result is correct, a rate of which the respective first and second result is incorrect, and an incorrect result cost if the respective first and second result is incorrect; and a processor utilizing the first cost profile and the second cost profile from said cost tuner to determine an optimum result from among the first result and the second result.

36. The system of claim 35, wherein said first module provides the first result based on an operation, and said second module provides the second result based on the same operation as in said first module.

* * * * *